US011084509B2

(12) United States Patent
Kuroki et al.

(10) Patent No.: US 11,084,509 B2
(45) Date of Patent: Aug. 10, 2021

(54) RAILWAY VEHICLE

(71) Applicant: MITSUBISHI HEAVY INDUSTRIES Engineering, Ltd., Yokohama (JP)

(72) Inventors: Katsuya Kuroki, Tokyo (JP); Akihisa Kawauchi, Tokyo (JP); Hiroyuki Kono, Tokyo (JP); Takeshi Kora, Tokyo (JP); Yoshinori Mitsui, Tokyo (JP); Eigo Hayashi, Tokyo (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 329 days.

(21) Appl. No.: 16/349,472

(22) PCT Filed: Nov. 2, 2017

(86) PCT No.: PCT/JP2017/039727
§ 371 (c)(1),
(2) Date: May 13, 2019

(87) PCT Pub. No.: WO2018/092601
PCT Pub. Date: May 24, 2018

(65) Prior Publication Data
US 2019/0337537 A1    Nov. 7, 2019

(30) Foreign Application Priority Data
Nov. 21, 2016 (JP) .............................. JP2016-226243

(51) Int. Cl.
*B61F 5/24* (2006.01)
*B61F 5/38* (2006.01)

(52) U.S. Cl.
CPC . *B61F 5/24* (2013.01); *B61F 5/38* (2013.01)

(58) Field of Classification Search
CPC ...... B61F 5/00; B61F 5/02; B61F 5/04; B61F 5/12; B61F 5/22; B61F 5/24; B61F 5/26; B61F 5/30; B61F 5/38; B61F 5/50
See application file for complete search history.

(56) References Cited

U.S. PATENT DOCUMENTS

| 4,596,194 A * | 6/1986 | Paton ......................... B61F 5/24 |
| | | 105/199.3 |
| 2010/0252969 A1* | 10/2010 | Tomada .................... B61F 5/24 |
| | | 267/64.11 |

FOREIGN PATENT DOCUMENTS

| GB | 2361222 | * 10/2001 | ............... B61F 5/12 |
| JP | 2010-241356 A | 10/2010 | |

(Continued)

OTHER PUBLICATIONS

PCT/ISA/210, "International Search Report for International Application No. PCT/JP2017/039727," dated Jan. 30, 2018.

(Continued)

*Primary Examiner* — Robert J McGarry, Jr.
(74) *Attorney, Agent, or Firm* — Manabu Kanesaka; Benjamin Hauptman; Kenneth Berner

(57) ABSTRACT

This railway vehicle is provided with: a bracket including a contact surface which is in contact with a second surface of a second plate member, and also including a recess which is provided in a portion facing an uneven surface; and a dynamic vibration absorber including a damper section which is located on the side opposite the contact surface and which is affixed to the bracket, and also including a weight section which is disposed on the side opposite the side to which the bracket is provided and which is disposed on the damper section. The bracket is separated from the uneven surface.

7 Claims, 13 Drawing Sheets

(56) References Cited

FOREIGN PATENT DOCUMENTS

| JP | 2011-016491 | A | | 1/2011 | | |
|---|---|---|---|---|---|---|
| JP | 2014-151794 | A | | 8/2014 | | |
| KR | 101498450 | B1 | * | 3/2015 | ................ | B61F 3/16 |
| WO | WO-2013091319 | A1 | * | 6/2013 | ................ | B61F 5/10 |
| WO | WO-2016063382 | A1 | * | 4/2016 | ................ | B61F 5/08 |

OTHER PUBLICATIONS

PCT/ISA/237, "Written Opinion of the International Searching Authority for International Application No. PCT/JP2017/039727," dated Jan. 30, 2018.

* cited by examiner

RAILWAY VEHICLE

TECHNICAL FIELD

The present invention relates to a railway vehicle which travels on a track while being guided by a guide rail or the like.

This application claims the right of priority based on Japanese Patent Application No. 2016-226243 filed with the Japan Patent Office on Nov. 21, 2016, the contents of which are incorporated herein by reference.

BACKGROUND ART

As new transportation means other than buses or railways, track type transportation systems which travel on tracks with wheels equipped with rubber tires are known. This type of track type transportation system is generally called a "new transportation system", and guide wheels disposed at both side portions or the like of a vehicle are guided by guide rails provided along the track.

As a specific example of the new transportation system, there is, for example, an automated people mover (APM), an automated guideway transit (AGT) for city use, or the like.

In railway vehicles which are adopted in the track type transportation systems described above, there is a concern that elastic vibration in an up-down direction may occur in a vehicle body. For this reason, a railway vehicle of the related art is provided with a dynamic vibration absorber which suppresses vibration in a vehicle traveling direction (refer to, for example, PTL 1).

Specifically, PTL 1 discloses a railway vehicle which includes a vehicle, a suspension frame which is fixed to a lower portion of a vehicle body and extends downward from the vehicle body, a wheel set which is rotationally driven by a driving part, and a traction link which extends a vehicle traveling direction and has one end connected to the wheel set and the other end connected to the suspension frame, and is provided with a running device which supports the vehicle from below, and a dynamic vibration absorber which is directly provided at the suspension frame and suppresses vibration in the vehicle traveling direction (a traveling direction of the vehicle body).

CITATION LIST

Patent Literature

[PTL 1] Japanese Unexamined Patent Application Publication No. 2014-151794

SUMMARY OF INVENTION

Technical Problem

Incidentally, since the suspension frame is configured by welding a plurality of plate members, it includes a plurality of welded portions. For this reason, a plurality of concavities and convexities due to welding are formed on a surface which is located on the side opposite to the surface where the welded portions of the plurality of plate member welded portions are formed.

As in PTL 1, if the dynamic vibration absorber is directly provided on an uneven surface of the plate member in which the plurality of concavities and convexities are formed, the adhesion between the uneven surface of the plate member and the surface of the dynamic vibration absorber, which comes into contact with the uneven surface, is lowered, and thus a load which is applied to the wheel set is not efficiently transmitted to the dynamic vibration absorber.

In this way, vibration which is transmitted from the suspension frame to the vehicle body cannot be sufficiently suppressed, and thus there is a concern that it may become difficult to improve ride comfort (vibration or noise).

Therefore, the present invention has an object to provide a railway vehicle in which it is possible to improve ride comfort (vibration or noise) by sufficiently suppressing vibration which is transmitted from a suspension frame to a vehicle body.

Solution to Problem

In order to solve the above problem, according to an aspect of the present invention, there is provided a railway vehicle including: a vehicle body; a suspension frame having a first plate member which is fixed to a lower portion of the vehicle body and extends downward from the vehicle body and in a traveling direction of the vehicle body, a second plate member having a first surface which is in contact with an end surface of the first plate member, and a second surface which is located on the side opposite to the first surface, a welded portion which is disposed on the first surface and connects the first plate member and the second plate member to each other, and an uneven surface which includes a plurality of concavities and convexities provided in a portion which is located on the side opposite to the welded portion, of the second surface; a bogie device which includes a driving source and a wheel set which is rotationally driven by the driving source; a traction link which is connected to the wheel set and the suspension frame and extends in the traveling direction of the vehicle body; a bracket which includes a contact surface which is in contact with the second surface, and a recess provided in a portion facing the uneven surface; and a dynamic vibration absorber which includes a damper section which is located on the side opposite to the contact surface and fixed to the bracket, and a weight section which is located on the side opposite to the side where the bracket is provided, and is disposed on the damper section, in which the bracket is separated from the uneven surface.

According to the present invention, the bracket which includes the contact surface which is in contact with the second surface and the recess provided in the portion facing the uneven surface is provided between the second plate member having the uneven surface on a part of the second surface and the damper section and the bracket is separated from the uneven surface, whereby the adhesion between the second surface excluding the uneven surface and the contact surface is improved, and therefore, it becomes possible to efficiently transmit a load which is applied to the wheel set to the dynamic vibration absorber.

In this way, vibration which is transmitted from the suspension frame to the vehicle body is sufficiently suppressed, and therefore, it is possible to improve the ride comfort (vibration or noise) of the railway vehicle.

Further, in the railway vehicle according to the aspect of the present invention, the second surface of the second plate member connected to the end surface of the first plate member may be inclined with respect to an up-down direction of the vehicle body and the traveling direction of the vehicle body.

In this manner, the second surface of the second plate member connected to the end surface of the first plate member is inclined with respect to the up-down direction of the vehicle body and the traveling direction of the vehicle body, whereby the central axis of the dynamic vibration absorber is inclined with respect to the up-down direction and the traveling direction of the vehicle body, and therefore, it becomes possible to efficiently transmit loads in the up-down direction of the vehicle body and in a lateral direction orthogonal to the up-down direction, which are applied to the wheel set, to the dynamic vibration absorber.

In this way, it becomes possible to further suppress the vibration which is transmitted from the suspension frame to the vehicle body, and therefore, it is possible to further improve the ride comfort (vibration or noise) of the railway vehicle.

Further, in the railway vehicle according to the aspect of the present invention, the railway vehicle may further include a protective cover having a shape which surrounds the dynamic vibration absorber, and attachable and detachable to and from to the bracket.

The railway vehicle has the protective cover configured as described above, whereby it becomes possible to protect the dynamic vibration absorber from rainwater, dust, or the like, and therefore, it is possible to suppress deterioration of the dynamic vibration absorber due to rainwater, dust, or the like.

Further, when the dynamic vibration absorber comes off from the bracket, it becomes possible to suppress falling of the dynamic vibration absorber onto a traveling surface, and therefore, occurrence of an accident due to the falling of the dynamic vibration absorber onto the traveling surface can be suppressed.

Further, the protective cover attachable and detachable to and from the bracket is provided, whereby it is possible to easily perform the maintenance (adjustment, replacement, or the like) of the dynamic vibration absorber.

Further, in the railway vehicle according to the aspect of the present invention, the railway vehicle may further include: a hinge part provided on a side wall of the bracket; a protective cover having a shape which surrounds the dynamic vibration absorber, and supported by the hinge part so as to be openable and closable with respect to the dynamic vibration absorber; and a position restricting mechanism provided on the side wall of the bracket and the protective cover to restrict a position of the protective cover in a state where the protective cover is closed.

The railway vehicle has the hinge part, the protective cover, and the position restricting mechanism configured as described above, whereby it becomes possible to protect the dynamic vibration absorber from rainwater, dust, or the like, and therefore, it is possible to suppress deterioration of the dynamic vibration absorber due to rainwater, dust, or the like.

Further, when the dynamic vibration absorber comes off from the bracket, it becomes possible to suppress falling of the dynamic vibration absorber, and therefore, occurrence of an accident due to the falling of the dynamic vibration absorber onto the traveling surface can be suppressed.

Further, the railway vehicle has the protective cover supported by the hinge part so as to be openable and closable with respect to the dynamic vibration absorber, whereby it is possible to easily perform the maintenance (adjustment, replacement, or the like) of the dynamic vibration absorber.

Furthermore, since it is not necessary to remove the protective cover at the time of the maintenance of the dynamic vibration absorber, loss of the protective cover can be suppressed.

Further, in the railway vehicle according to the aspect of the present invention, the railway vehicle may further include a guide mechanism for guiding the weight section in an extending direction of a central axis of the dynamic vibration absorber.

The railway vehicle has the guide mechanism configured as described above, whereby it becomes possible to suppress occurrence of vibration of the weight section in directions other than the extending direction of the central axis of the dynamic vibration absorber orthogonal to the contact surface.

In this way, it becomes possible to efficiently transmit a load in the extending direction of the central axis of the dynamic vibration absorber to the weight section, and therefore, the performance of the dynamic vibration absorber can be effectively exerted.

Further, in the railway vehicle according to the aspect of the present invention, the railway vehicle may further include: a hinge part provided at the guide mechanism; a protective cover having a shape which surrounds a portion exposed from the guide mechanism, of the dynamic vibration absorber, and supported by the hinge part so as to be openable and closable with respect to the guide mechanism; and a position restricting mechanism which restricts a position of the protective cover in a state where the protective cover is closed.

The railway vehicle has the hinge part, the protective cover, and the position restricting mechanism configured as described above, whereby it becomes possible to protect the dynamic vibration absorber exposed from the guide mechanism from rainwater, dust, or the like, and therefore, it is possible to suppress deterioration of the dynamic vibration absorber due to rainwater, dust, or the like.

Further, when the dynamic vibration absorber comes off from the bracket, it becomes possible to suppress falling of the dynamic vibration absorber onto the traveling surface. In this way, occurrence of an accident due to the falling of the dynamic vibration absorber onto the traveling surface can be suppressed.

Further, the railway vehicle has the protective cover supported by the hinge part so as to be openable and closable with respect to the dynamic vibration absorber, whereby it is possible to easily perform the maintenance (adjustment, replacement, or the like) of the dynamic vibration absorber.

Further, in the railway vehicle according to the aspect of the present invention, a reinforcing plate for reinforcing the suspension frame may be provided at the suspension frame corresponding to a disposition position of the bracket.

In this manner, the reinforcing plate for reinforcing the suspension frame is provided at the suspension frame corresponding to the disposition position of the bracket, whereby it is possible to obtain rigidity capable of sufficiently withstanding the weight of the bracket and the dynamic vibration absorber fixed to the bracket, without adding a rib to the suspension frame.

Advantageous Effects of Invention

According to the present invention, it is possible to improve the ride comfort (vibration or noise) of the railway vehicle by sufficiently suppressing vibration which is transmitted from the suspension frame to the vehicle body.

DESCRIPTION OF EMBODIMENTS

Figure 1:
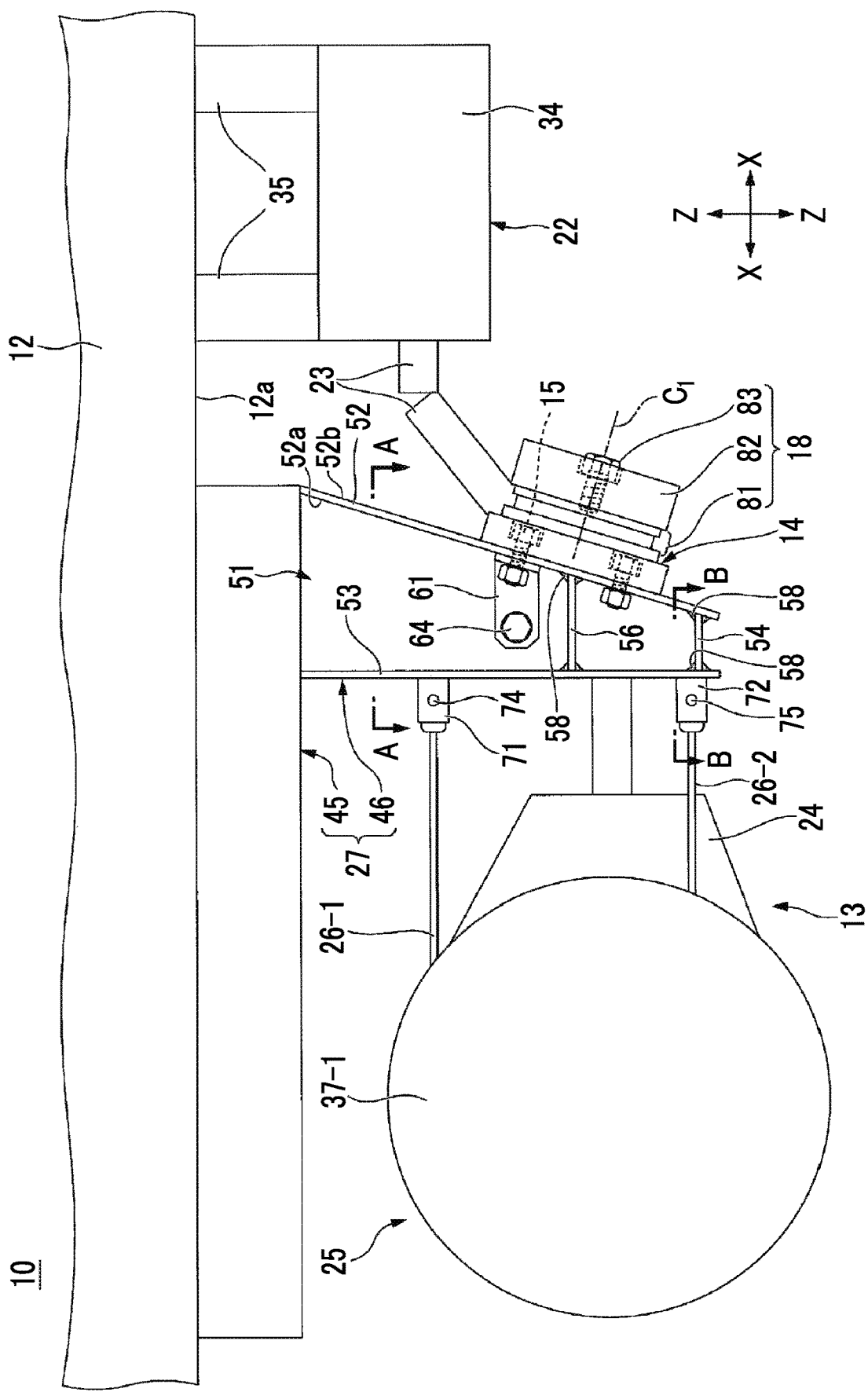
FIG. 1 is a side view showing a schematic configuration of a railway vehicle according to a first embodiment of the present invention.

Hereinafter, embodiments to which the present invention is applied will be described in detail with reference to the drawings. The drawings which are used in the following description are for describing configurations of the embodiments of the present invention, and there is a case where the sizes, thicknesses, dimensions, or the like of the respective parts shown in the drawings are different from the dimensional relationships of an actual railway vehicle.

First Embodiment

FIG. 1 is a side view showing a schematic configuration of a railway vehicle according to a first embodiment of the present invention.

In FIG. 1, an X-X direction indicates a traveling direction of a vehicle body 12, a Z-Z direction indicates an up-down direction of the vehicle body 12, which is orthogonal to the X-X direction, and $C_1$ indicates a central axis (hereinafter referred to as a "central axis $C_1$") of a dynamic vibration absorber 18.

In FIG. 1, from the viewpoint of making the drawing easy to see, illustration of the configurations of portions corresponding to areas $D_1$ and $D_2$ shown in FIG. 4 (described later) is omitted.

Figure 2:
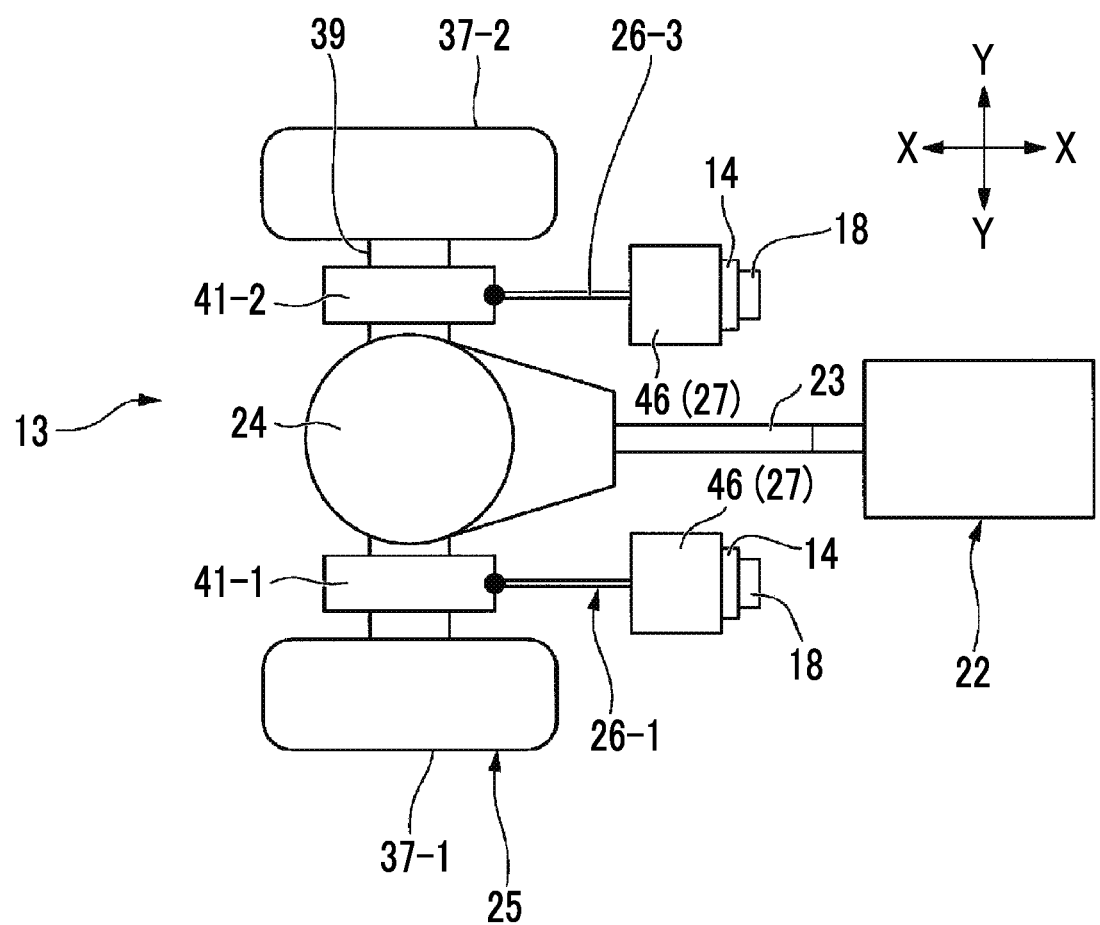
FIG. 2 is a plan view showing a schematic configuration of a running device shown in FIG. 1.

FIG. 2 is a plan view showing a schematic configuration of a running device shown in FIG. 1. In FIG. 2, a Y-Y direction indicates a width direction (hereinafter referred to as a "vehicle width direction") of a railway vehicle 10, which is orthogonal to the X-X direction and the Z-Z direction. In FIG. 2, the same constituent portions as those of the structure shown in FIG. 1 are denoted by the same reference numerals.

Figure 3:
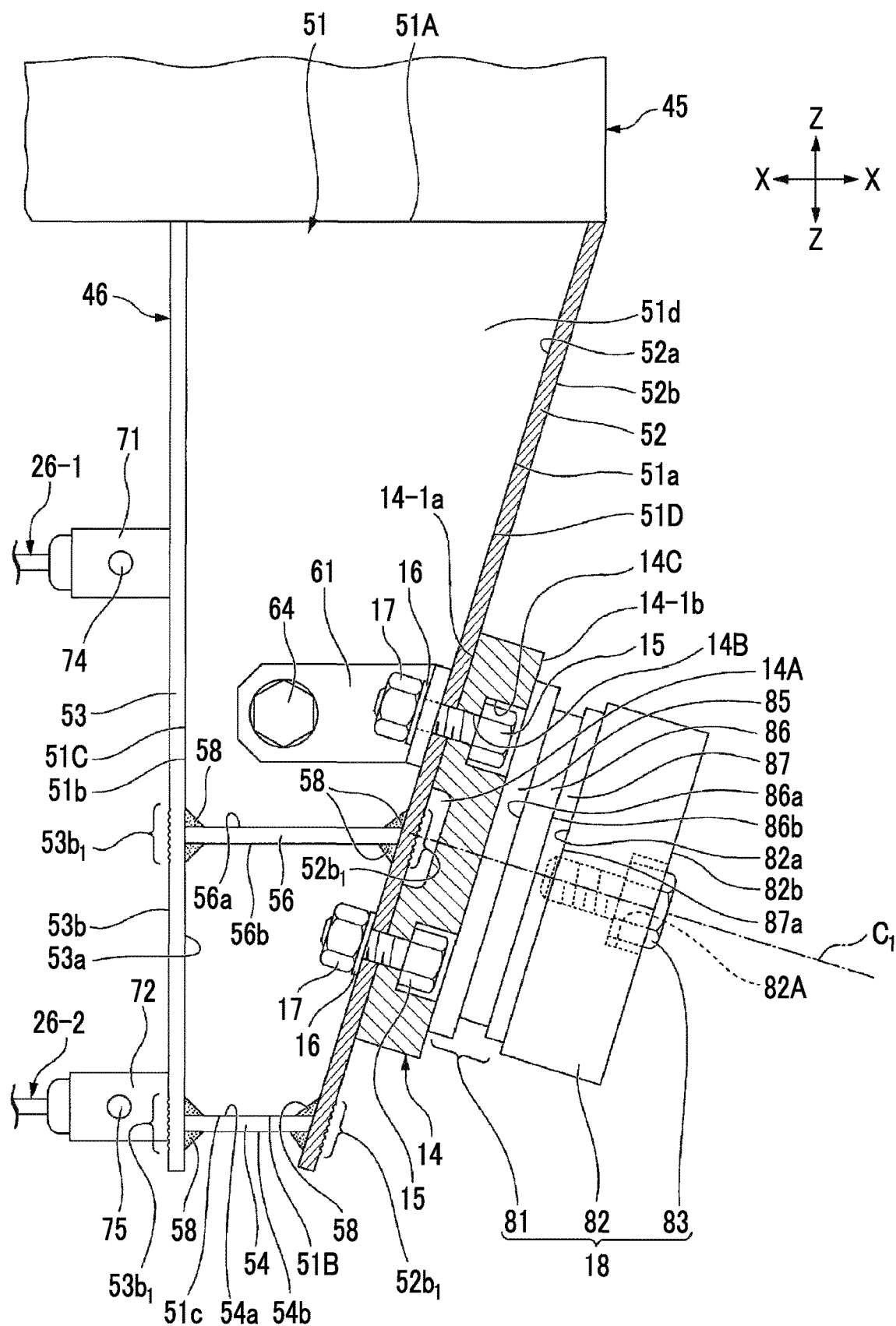
FIG. 3 is an enlarged partial sectional view of a hanging part, a bracket, and a dynamic vibration absorber shown in FIG. 1.

FIG. 3 is an enlarged partial sectional view of a hanging part, a bracket, and a dynamic vibration absorber shown in FIG. 1.

The cross-sectional portions shown in FIG. 3 are cross-sections in a case where a second plate member 52 and a bracket 14 configuring a hanging part 46 are cut along line E-E shown in FIG. 5 (described later). In FIG. 3, the same constituent portions as those of the structure shown in FIGS. 1 and 2 are denoted by the same reference numerals.

In FIG. 3, from the viewpoint of making the drawing easy to see, illustration of the configurations of the portions corresponding to the areas $D_1$ and $D_2$ shown in FIG. 4 (described later) is omitted.

Figure 4:
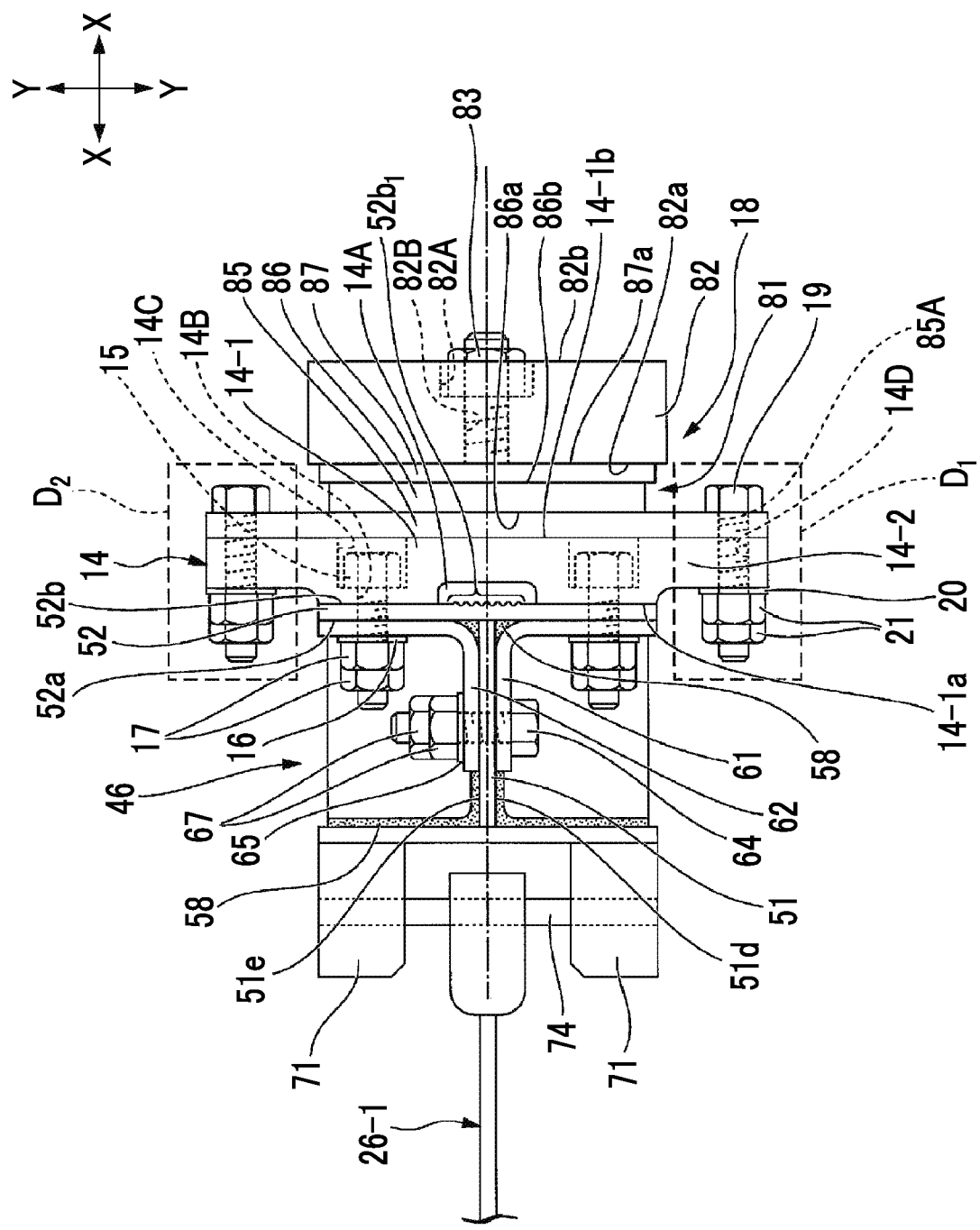
FIG. 4 is a plan view of a structure in which a fixed part is removed from a structure shown in FIG. 3.

FIG. 4 is a plan view of a structure in which a fixed part is removed from the structure shown in FIG. 3. In FIG. 4, the same constituent portions as those of the structure shown in FIGS. 1 to 3 are denoted by the same reference numerals.

Referring to FIGS. 1 to 4, the railway vehicle 10 of the first embodiment includes the vehicle body 12, a running device 13, the bracket 14, a plurality of bolts 15 and 19, a plurality of washers 16 and 20, a plurality of nuts 17 and 21, and the dynamic vibration absorber 18.

The vehicle body 12 extends in the X-X direction and has a substantially rectangular parallelepiped-shaped hollow portion (not shown) in the interior thereof. The hollow portion is used as a space for accommodating passengers, and a seat (not shown) or the like is disposed therein.

The running device 13 includes a driving source 22, a drive shaft 23, a gear box 24, a wheel set 25, a shock absorber (not shown), traction links 26-1 to 26-3, a traction link (not shown), and a suspension frame 27.

The driving source 22 generates rotational power by using electric power which is supplied from the outside. The driving source 22 is connected to one end of the drive shaft 23. The driving source 22 is connected to the gear box 24 through the drive shaft 23.

The driving source 22 has a casing 34 which covers a driving source main body (not shown) which is an electric motor.

The casing 34 is mounted to a lower surface 12a of a floor of the vehicle body 12 through a vibration-proofing material 35. As the vibration-proofing material 35, for example, vibration-proofing rubber or the like can be used.

The other end of the drive shaft 23 is connected to the gear box 24. The drive shaft 23 transmits the rotational power generated by the driving source 22 to a power transmission mechanism (not shown) accommodated in the gear box 24.

The gear box 24 accommodates the power transmission mechanism (not shown) such as a differential mechanism and a speed reducing mechanism.

The wheel set 25 includes wheels 37-1 and 37-2 for traveling, an axle shaft 39, and bogie frames 41-1 and 41-2. A bogie device includes the driving source 22 and the wheel set 25.

The wheels 37-1 and 37-2 are wheels having the same configuration. As the wheels 37-1 and 37-2, for example, tire-equipped wheels each having a rubber tire mounted thereon may be used.

The axle shaft 39 extends on both sides in the vehicle width direction of the gear box 24, which is orthogonal to the X-X direction. The wheel 37-1 is connected to one end of the axle shaft 39. The wheel 37-2 is connected to the other end of the axle shaft 39.

The rotational power which is transmitted from the driving source 22 to the power transmission mechanism (not shown) in the gear box 24 through the drive shaft 23 is distributed to the axle shaft 39.

The bogie frame 41-1 is provided at the axle shaft 39 which is located between the wheel 37-1 and the gear box 24. The bogie frame 41-2 is provided at the axle shaft 39 which is located between the wheel 37-2 and the gear box 24. The bogie frames 41-1 and 41-2 rotatably support the axle shaft 39.

The bogie frames 41-1 and 41-2 accept forces in a vehicle body advancing direction acting on the wheel set 25, which are driving forces and braking forces from the wheels 37-1 and 37-2.

A shock absorber (not shown) having an air spring or the like is disposed between each of the bogie frames 41-1 and 41-2 and a floor portion of the vehicle body 12.

One end of the traction link 26-1 is fixed to the bogie frame 41-1, and the other end thereof is connected to an upper portion of the hanging part 46 on one side, which configures the suspension frame 27.

The traction link 26-2 is disposed below the traction link 26-1. One end of the traction link 26-2 is fixed to the bogie frame 41-1, and the other end thereof is connected to a lower portion of the hanging part 46 on one side, which configures the suspension frame 27.

One end of the traction link 26-3 is fixed to the bogie frame 41-2, and the other end thereof is connected to an upper portion of the hanging part 46 on the other side, which configures the suspension frame 27. The traction link 26-3 is disposed at substantially the same height as the height of the traction link 26-1.

The traction link (not shown) is disposed below the traction link 26-3. One end of the traction link is fixed to the bogie frame 41-2, and the other end thereof is connected to a lower portion of the hanging part 46 on the other side, which configures the suspension frame 27.

The traction links 26-1 to 26-3 and the traction link (not shown) extend in the X-X direction. The traction links 26-1 to 26-3 and the traction link (not shown) transmit a force in the X-X direction from the bogie frames 41-1 and 41-2 to the suspension frames 27 while allowing the displacement in the up-down direction of the bogie frames 41-1 and 41-2 due to the expansion and contraction operation of the air spring (not shown) or the like configuring the shock absorber (not shown).

The suspension frame 27 has a function of transmitting the force in the X-X direction which is transmitted from the traction links 26-1 to 26-3 and the traction link (not shown) to the vehicle body 12. The suspension frame 27 includes a fixed part 45 and the hanging part 46.

The fixed part 45 is fixed to the lower surface of the floor portion of the vehicle body 12. The fixed part 45 extends in the X-X direction above the wheels 37-1 and 37-2.

Two hanging parts 46 are provided below the fixed part 45 which is located between the gear box 24 and the driving source 22.

Figure 5:
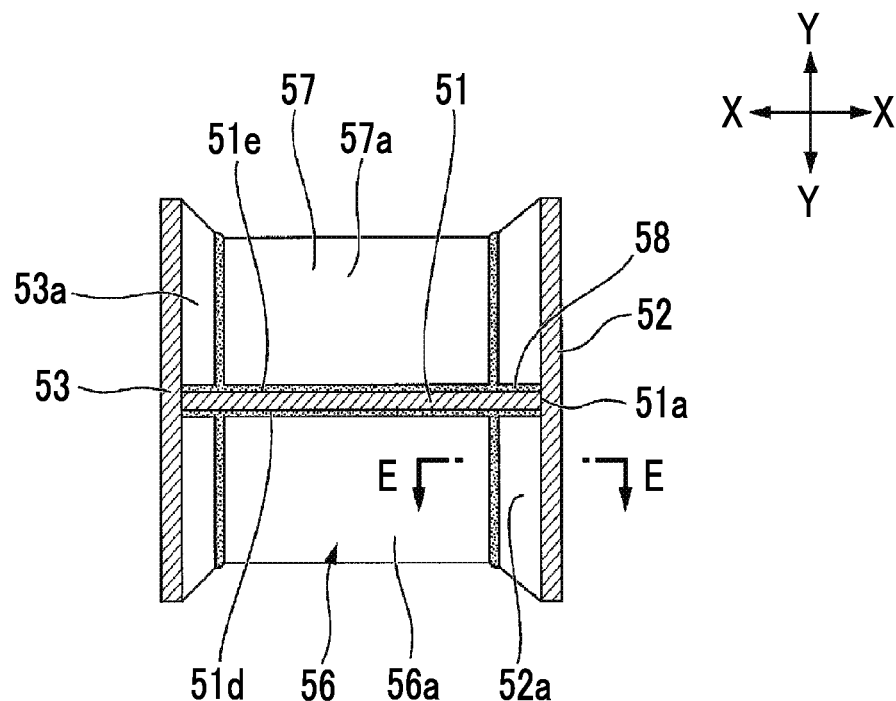
FIG. 5 is a plan view of the hanging part cut along line A-A shown in FIG. 1.

FIG. 5 is a plan view of the hanging part cut along line A-A shown in FIG. 1. In FIG. 5, the same constituent portions as those of the structure shown in FIGS. 1 to 4 are denoted by the same reference numerals.

Figure 6:
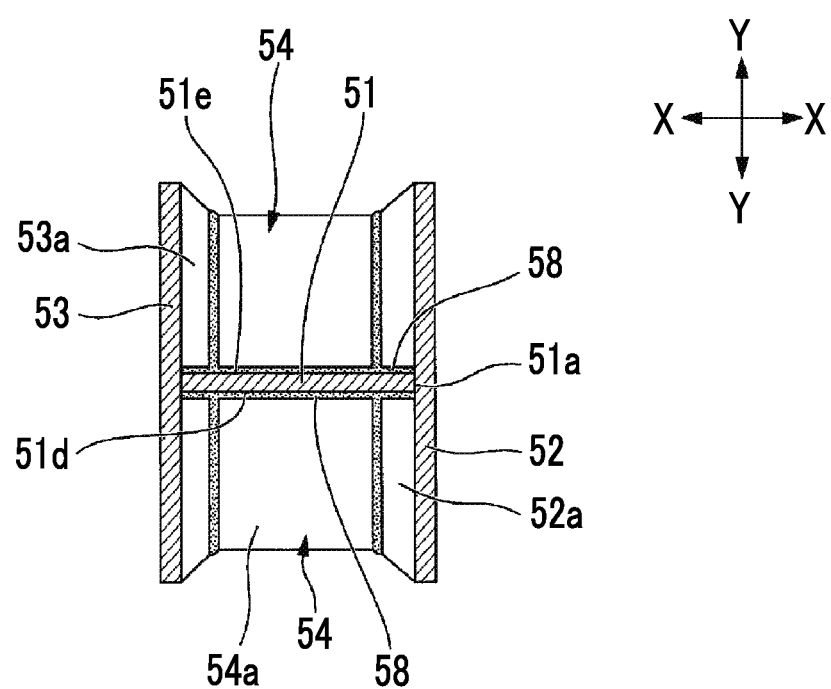
FIG. 6 is a plan view of the hanging part cut along line B-B shown in FIG. 1.

FIG. 6 is a plan view of the hanging part cut along line B-B shown in FIG. 1. In FIG. 6, the same constituent portions as those of the structure shown in FIGS. 1 to 5 are denoted by the same reference numerals.

Referring to FIGS. 3 to 6, the hanging part 46 has a first plate member 51, second plate members 52 to 54, third plate members 56 and 57, a welded portion 58, reinforcing plates 61 and 62, a bolt 64, a washer 65, a nut 67, shaft mounting members 71 and 72, and shafts 74 and 75.

The first plate member 51 is a plate having a substantially uniform thickness and is fixed to a lower portion of the vehicle body 12. The first plate member 51 extends downward (the X-X direction) from the vehicle body 12 and in the Z-Z direction orthogonal to the vehicle width direction.

The shape of the first plate member 51 can be, for example, a trapezoidal shape in a state as viewed from the side (a state shown in FIG. 3).

Specifically, the shape of the first plate member 51 is a trapezoidal shape in which an upper side 51A is longer than a lower side 51B and an angle between a side 51C (a side on one side of a leg of a trapezoid) which is located on the side on which the traction links 26-1 to 26-3 are disposed and the upper side 51A is a right angle.

In this way, a side 51D (a side on the other side of the leg of the trapezoid) on the side where the bracket 14 is disposed is inclined with respect to the X-X direction and the Z-Z direction.

The first plate member 51 has end surfaces $51a$ to $51c$ and surfaces $51d$ and $51e$. The second plate member 52 is joined to the end surface $51a$. The second plate member 53 is joined to the end surface $51b$. The second plate member 54 is joined to the end surface $51c$.

The surface $51d$ is a surface orthogonal to the Y-Y direction. The surface $51e$ is a surface which is located on the side opposite to the surface $51d$ and is orthogonal to the Y-Y direction.

The second plate member 52 is a plate having a substantially uniform thickness. The second plate member 52 has a first surface $52a$ and a second surface $52b$. The first surface $52a$ is in contact with the end surface $51a$ corresponding to the side 51D. The end surface $51a$ is disposed at a position dividing the area of the first surface $52a$ into two parts.

The second plate member 52 is joined to the first plate member 51, the second plate member 54, and the third plate members 56 and 57 by welding. Therefore, the welded portions 58 are provided at boundary portions between the second plate member 52, and the first plate member 51, the second plate member 54, and the third plate members 56 and 57.

In a case of using fusion welding as a welding method, for example, molten metal in which only the first and second plate members 51 and 52 are melted, or molten metal in which the first and second plate members 51 and 52 and filler metal (for example, a welding rod or the like) are fused together is solidified to form the welded portion 58.

The second surface $52b$ is disposed on the side opposite to the first surface $52a$ and is a surface parallel to the first surface $52a$. The second surface $52b$ is a surface with which a contact surface $14-1a$ of the bracket 14 to which the dynamic vibration absorber 18 is fixed is in contact. As described above, the second plate member 52 is joined to the end surface $51a$ of the first plate member 51, whereby the second surface $52b$ is inclined with respect to the X-X direction and the Z-Z direction.

In this manner, the second surface $52b$ of the second plate member 52 connected to the end surface $51a$ of the first plate member 51 is inclined with respect to the Z-Z direction and the X-X direction, whereby the central axis $C_1$ of the dynamic vibration absorber 18 is inclined with respect to the Z-Z direction and the X-X direction, and therefore, it becomes possible to efficiently transmit loads in the Z-Z direction and the Y-Y direction which the wheel set 25 receives, to the dynamic vibration absorber 18.

In this way, it becomes possible to suppress vibration which is transmitted from the hanging part 46 configuring the suspension frame 27 to the vehicle body 12, and therefore, it is possible to improve ride comfort (vibration or noise) of the railway vehicle 10.

The second surface 52b has an uneven surface 52b₁ at a portion which is located on the side opposite to the welded portion 58 disposed on the first surface 52a side.

The uneven surface 52b₁ is a surface which is formed when the second plate member 52 is joined to the first plate member 51, the second plate member 54, and the third plate members 56 and 57 by welding, and includes a plurality of concavities and convexities.

If the bracket 14 or the dynamic vibration absorber 18 is brought into direct contact with the uneven surface 52b₁, the adhesion between the uneven surface 52b₁ and the bracket 14 or the dynamic vibration absorber 18 is lowered and it becomes difficult to sufficiently exert the characteristics of the dynamic vibration absorber 18, and therefore, it is not preferable.

The second plate member 53 is a plate having a substantially uniform thickness. The second plate member 53 has a first surface 53a and a second surface 53b. The first surface 53a is in contact with the end surface 51b corresponding to the side 51C. The end surface 51b is disposed at a position dividing the area of the first surface 53a into two parts. The first surface 53a is a surface parallel to the Z-Z direction.

The second plate member 53 is joined to the first plate member 51, the second plate member 54, and the third plate members 56 and 57 by welding. Therefore, the welded portions 58 are provided at boundary portions between the second plate member 53, and the first plate member 51, the second plate member 54, and the third plate members 56 and 57.

The second surface 53b is disposed on the side opposite to the first surface 53a and is a surface parallel to the first surface 53a. The second surface 53b is a surface parallel to the Z-Z direction.

The second surface 53b has an uneven surface 53b₁ at a portion which is located on the side opposite to the welded portion 58 disposed on the first surface 53a side.

The uneven surface 53b₁ is a surface which is formed when the second plate member 53 is joined to the first plate member 51, the second plate member 54, and the third plate members 56 and 57 by welding, and includes a plurality of concavities and convexities.

The second plate member 54 is a plate having a substantially uniform thickness. The second plate member 54 has a first surface 54a and a second surface 54b. The first surface 54a is in contact with the end surface 51c corresponding to the lower side 51B. The end surface 51b is disposed at a position dividing the area of the first surface 54a into two parts. The first surface 54a is a surface parallel to the X-X direction.

The second plate member 54 is joined to the first plate member 51, the second plate members 52 and 53, and the third plate members 56 and 57 by welding. Therefore, the welded portions 58 are provided at boundary portions between the second plate member 54, and the first plate member 51, the second plate members 52 and 53, and the third plate members 56 and 57.

The second surface 54b is disposed on the side opposite to the first surface 54a and is a surface parallel to the first surface 54a. The second surface 54b is a surface parallel to the X-X direction.

The second surface 54b has an uneven surface (not shown) at a portion which is located on the side opposite to the welded portion 58 disposed on the first surface 54a side.

The uneven surface is a surface which is formed when the second plate member 54 is joined to the first plate member 51, the second plate members 52 and 53, and the third plate members 56 and 57 by welding, and includes a plurality of concavities and convexities.

The third plate member 56 is a plate having a substantially uniform thickness. The third plate member 56 is provided in a region partitioned by the surface 51d of the first plate member 51 and the second plate members 52 and 53.

Three end surfaces of the third plate member 56 are joined to the first and second plate members 51 to 53 by welding.

The welded portion 58 is provided at a joint portion between the third plate member 56 and each of the first and second plate members 51 to 53. The third plate member 56 is disposed between the fixed part 45 and the second plate member 54.

The third plate member 56 has a surface 56a facing the fixed part 45, and a surface 56b which is disposed on the side opposite to the surface 56a and faces the first surface 54a. The surfaces 56a and 56b are orthogonal to the Z-Z direction.

In FIG. 5, only the welded portion 58 provided on the surface 56a side of the third plate member 56 is shown. However, as partially shown in FIG. 3, two U-shaped welded portions 58 are provided on the surface 56b side of the third plate member 56.

The third plate member 57 is a plate having a substantially uniform thickness. The third plate member 57 is provided in a region partitioned by the surface 51e of the first plate member 51 and the second plate members 52 and 53.

Three end surfaces of the third plate member 57 are joined to the first and second plate members 51 to 53 by welding. The welded portion 58 is provided at a joint portion between the third plate member 57 and each of the first and second plate members 51 to 53.

The third plate member 57 is disposed so as to face the third plate member 56 through the first plate member 51 in the Y-Y direction.

The third plate member 57 has a surface 57a facing the fixed part 45 and a surface (not shown) which is disposed on the side opposite to the surface 57a and faces the first surface 54a. The surface 57a and the surface (not shown) are orthogonal to the Z-Z direction.

In FIG. 5, only the welded portion 58 provided on the surface 57a side of the third plate member 57 is shown. However, the welded portion 58 having the same shape is also provided on the surface side which is located on the side opposite to the surface 57a.

The reinforcing plates 61 and 62 are provided in the suspension frame 27 corresponding to the disposition position of the bracket 14. Each of the reinforcing plates 61 and 62 can have an L shape, for example.

The reinforcing plate 61 is disposed so as to be in contact with the first surface 52a and the surface 51d which are located above the third plate member 56. The reinforcing plate 62 is in contact with the first surface 52a and the surface 51e which are located above the third plate member 57.

Through-holes (not shown) into which the bolt 64 can be inserted are provided in the reinforcing plates 61 and 62 and the first plate member 51. The reinforcing plates 61 and 62 are fixed to the first plate member 51 by the bolt 64 inserted into the through-holes from the reinforcing plate 61 side, the washer 65 disposed at a screw portion of the bolt 64 so as to come into contact with the reinforcing plate 62, and the nut 67 fastened to the bolt 64 with the washer 65 interposed therebetween.

In this manner, the reinforcing plates 61 and 62 for reinforcing the suspension frame 27 are provided in the suspension frame 27 corresponding to the disposition position of the bracket 14, whereby it is possible to obtain rigidity capable of sufficiently withstanding the weight of the bracket 14 and the dynamic vibration absorber 18 which is fixed to the bracket 14, without adding a rib to the suspension frame 27.

Two shaft mounting members 71 are provided at an upper portion of the second plate member 53 so as to be in contact with the second surface 53$b$. The two shaft mounting members 71 are disposed so as to face each other in the Y-Y direction.

Two shaft mounting members 72 are provided at a lower end portion of the second plate member 53 so as to be in contact with the second surface 53$b$. The two shaft mounting members 72 are disposed so as to face each other in the Y-Y direction.

One end portion of the shaft 74 is supported by the shaft mounting member 71 on one side, and the other end portion thereof is supported by the shaft mounting member 71 on the other side. The shaft 74 extends in the Y-Y direction.

One end portion of the shaft 75 is supported by the shaft mounting member 72 on one side, and the other end portion thereof is supported by the shaft mounting member 72 on the other side. The shaft 75 extends in the Y-Y direction.

Figure 7:
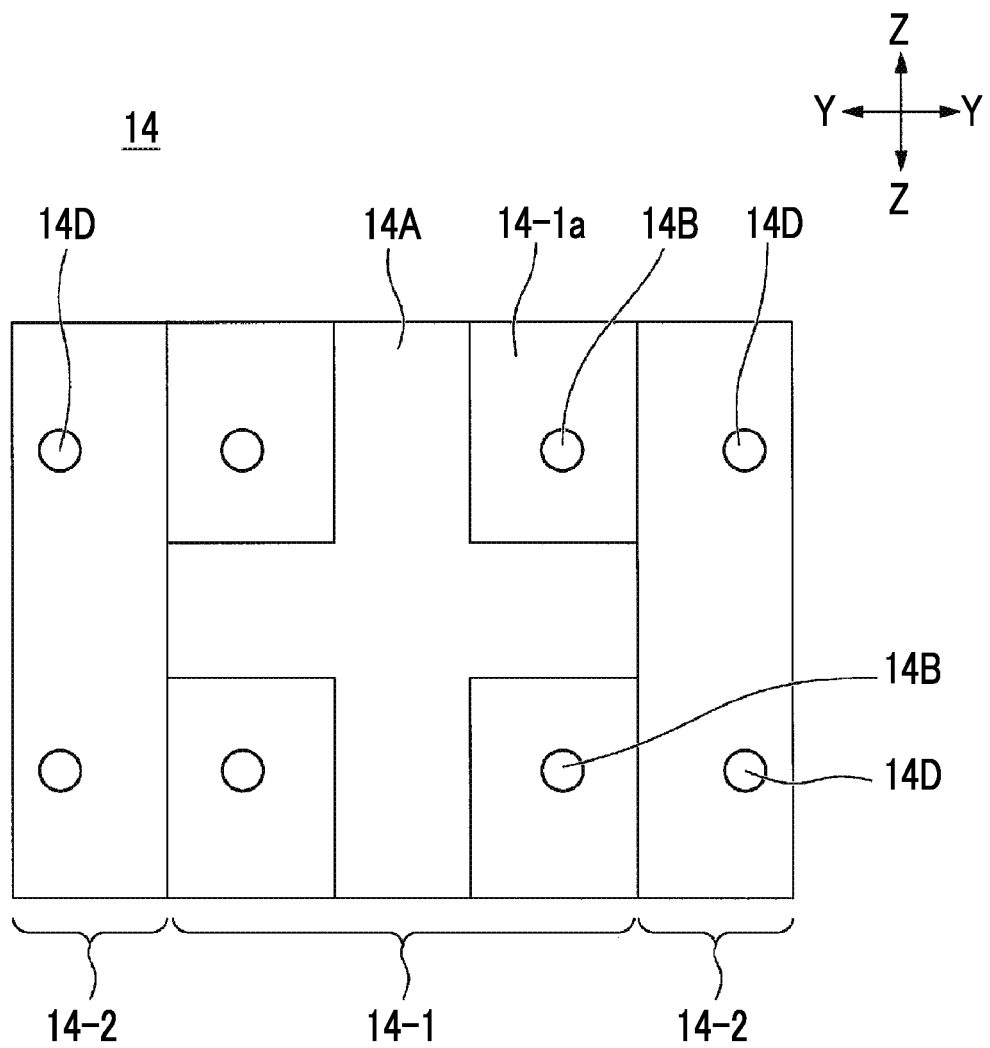
FIG. 7 is a plan view of the bracket shown in FIG. 4, as viewed from the side which comes into contact with a second surface of a second plate member.

FIG. 7 is a plan view of the bracket shown in FIG. 4, as viewed from the side which comes into contact with the second surface of the second plate member. In FIG. 7, the same constituent portions as those of the structure shown in FIGS. 3 and 4 are denoted by the same reference numerals.

Referring to FIGS. 3, 4, and 7, the bracket 14 has a first portion 14-1, a second portion 14-2, a recess 14A, a screw portion insertion hole 14B, a counterbore 14C, and a through-hole 14D.

The first portion 14-1 has the contact surface 14-1$a$ and a surface 14-1$b$. The contact surface 14-1$a$ is a flat surface which faces the second plate member 52 and is in contact with the second surface 52$b$ of the second plate member 52. The surface 14-1$b$ is a surface which is disposed on the side opposite to the contact surface 14-1$a$. The surface 14$b$-1 is a surface on which the dynamic vibration absorber 18 is disposed.

The thickness of the first portion 14-1 in the X-X direction is configured to be thicker than the thickness of the second portion 14-2.

The second portions 14-2 protrude in the Y-Y direction from both ends of the first portion 14-1, which are located in the Y-Y direction.

The recess 14A is provided in the first portion 14-1 which is located on the contact surface 14-1$a$ side.

The recess 14A has a shape capable of accommodating the uneven surface 52$b_1$ formed on the side opposite to the first surface 52$a$ on which the welded portion 58 is provided. As the recess 14A, for example, a cruciform groove can be used.

In this case, the length of the cruciform groove in the Z-Z direction is equal to the width of the first portion 14-1 in the Z-Z direction, and the length of the cruciform groove in the Y-Y direction is equal to the width of the first portion 14-1 in the Y-Y direction. In this way, the recess 14A divides the contact surface 14-1$a$ into four regions.

The cross-sectional shape when cutting the recess 14A in an imaginary plane orthogonal to the extending direction of the recess 14A may be, for example, a quadrangular shape, a semicircular shape, or a triangular shape.

In this manner, the recess 14A capable of accommodating the uneven surface 52$b_1$ on the contact surface 14-1$a$ side is provided in the bracket 14, whereby the contact surface 14-1$a$ and the uneven surface 52$b_1$ are not brought into contact with each other, and therefore, it becomes possible to improve the adhesion between the second surface 52$b$ of the second plate member 52 and the contact surface 14-1$a$.

In this way, a load is efficiently transmitted to the dynamic vibration absorber 18 through the suspension frame 27, and therefore, the oscillation or noise of the vehicle body 12 which is a target of the dynamic vibration absorber 18 can be suppressed.

The screw portion insertion hole 14B is provided in each of the four regions divided by the recess 14A. The screw portion insertion hole 14B is a hole into which a screw portion of the bolt 15 is inserted.

The counterbore 14C is provided in the first portion 14-1 which is located on the surface 14-1$b$ side. The counterbore 14C is integrated with one screw portion insertion hole 14B. The diameter of the counterbore 14C is configured to be larger than the diameter of the screw portion insertion hole 14B. A head portion of the bolt 15 is accommodated in the counterbore 14C.

Two through-holes 14D are provided in each of the second portions 14-2. The through-hole 14D penetrates the second portion 14-2. The two through-holes 14D are arranged in the Z-Z direction. The through-hole 14D is a hole into which a screw portion of the bolt 19 is inserted.

As the material of the bracket 14 having a configuration as described above, for example, it is favorable if a metal material (for example, SS400 (a rolled steel material for general structure)) is used.

The head portion of each of the plurality of bolts 15 is disposed in the counterbore 14C, and the screw portion thereof is inserted into the screw portion insertion hole 14B. Some of the bolts 15 among the plurality of bolts 15 are fastened to the washers 16 which are in contact with the reinforcing plate 61, and the nuts 17, and the remaining bolts 15 are fastened to the washers 16 which are in contact with the first surface 52$a$ of the second plate member 52, and the nuts 17.

That is, the bracket 14 described above is fixed to the second plate member 52 so as to be in contact with the second surface 52$b$ of the second plate member 52, by the plurality of bolts 15, the washers 16, and the nuts 17.

In FIGS. 3 and 4, as an example, a case where the bracket 14 is fixed to the second plate member 52 by using the plurality of bolts 15, the washers 16, and the nuts 17 has been described as an example. However, the bracket 14 may be bonded to the second plate member 52 by using, for example, an adhesive or the like.

Referring to FIGS. 3 and 4, the dynamic vibration absorber 18 has a function of suppressing vibration of the vehicle body 12 as a target by vibration of itself, and includes a damper section 81, a weight section 82, and a bolt 83. The damper section 81 includes a first support plate 85, an elastic section 86, and a second support plate 87.

The whole of the surface which is located on the bracket 14 side, among the surfaces of the first support plate 85, is in contact with the surface 14-1$b$. The first support plate 85 has a through-hole 85A having the same diameter as the through-hole 14D at a position facing the through-hole 14D. The bolt 19 is inserted into the through-holes 14D and 85A such that the head portion thereof is located on the first support plate 85 side. As first support plate 85, for example, a metal plate can be used.

The first support plate 85 is fixed to the bracket 14 by fastening the bolt 19 to the nut 21 which is in contact with the washer 20, through the washer 20 which is in contact with the bracket 14.

In FIGS. 3 and 4, as an example, a case where the first support plate 85 is fixed to the bracket 14 by using the plurality of bolts 19, the washers 20, and the nuts 21 has been described as an example. However, the first support plate 85 may be bonded to the bracket 14 by using, for example, an adhesive or the like.

The elastic section 86 is disposed between the first support plate 85 and the second support plate 87. The outer shape of the elastic section 86 is configured to be smaller than the outer shapes of the first and second support plates 85, 87 in the X-X direction and the Z-Z direction.

The elastic section 86 has a surface 86a which is a flat surface, and a surface 86b which is a flat surface disposed on the side opposite to the surface 86a. The whole of the surface 86a of the elastic section 86 is bonded to the first support plate 85.

The elastic section 86 can be configured with, for example, metal having a spring element, or an elastic body such as rubber.

The second support plate 87 has a surface 87a which is a flat surface being in contact with the weight section 82. The weight section 82 is bonded to the surface which is located on the side opposite to the surface 87a of the second support plate 87. The second support plate 87 is in contact with the whole of the surface 86b of the elastic section 86 at the surface 87a.

A female screw portion to which the screw portion of the bolt 83 is screwed is provided at the center of the second support plate 87 which is located on the surface 87a side.

The outer shape of the second support plate 87 is smaller than the outer shape of the first support plate 85 in the X-X direction and the Z-Z direction. As the second support plate 87, for example, a metal plate can be used.

The thicknesses, dimensions, and the like of the first support plate 85, the elastic section 86, and the second support plate 87 described above are adjusted such that a natural frequency corresponding to a vibration frequency to be canceled is obtained.

The weight section 82 has a surface 82a which is a flat surface which comes into contact with the surface 87a of the second support plate 87, a surface 82b which is a flat surface disposed on the side opposite to the surface 82a, a counterbore 82A, and a screw portion insertion hole 82B.

The counterbore 82A is provided at the center on the surface 82b side of the weight section 82. The head portion of the bolt 83 is disposed in the counterbore 82A.

The screw portion insertion hole 82B is provided at the center on the surface 82a side of the weight section 82 and is configured integrally with the counterbore 82A. The diameter of the screw portion insertion hole 82B is configured to be smaller than the diameter of the bolt 83.

The screw portion of the bolt 83 is inserted into the screw portion insertion hole 82B, and the bolt 83 is fastened to the second support plate 87. In this way, the weight section 82 is fixed to the second support plate 87. The weight section 82 is configured to have predetermined mass. The weight section 82 may be made of, for example, one type of metal material or a combination of two or more types of metal materials which are different in mass.

The mass of the weight section 82 is adjusted such that a natural frequency corresponding to a vibration frequency to be canceled is obtained.

In FIG. 3, as an example, a case where the weight section 82 is fixed to the second support plate 87 by using the bolt 83 has been described as an example. However, instead of this, the surface 82a of the weight section 82 may be bonded to the surface 87a of the second support plate 87 by using, for example, an adhesive or the like.

The dynamic vibration absorber 18 described above is provided on the second surface 52b of the second plate member 52 inclined with respect to the Z-Z direction, through the bracket 14, and therefore, the central axis $C_1$ of the dynamic vibration absorber 18 is inclined with respect to the X-X direction and the Z-Z direction.

For this reason, the dynamic vibration absorber 18 vibrates with respect to the Y-Y direction and the Z-Z direction, so that it becomes possible to reduce acceleration in the Y-Y direction and the Z-Z direction, which is generated in the suspension frame 27. Therefore, it is possible to suppress oscillation or noise which is transmitted to the vehicle body 12.

In FIGS. 1, 3, and 4, a case where the dynamic vibration absorber 18 is provided on the second surface 52b of the second plate member 52 inclined with respect to the Z-Z direction, through the bracket 14, has been described as an example. However, the dynamic vibration absorber 18 may be provided on the surface parallel to the Z-Z direction and orthogonal to the X-X direction, through the bracket 14.

According to the railway vehicle 10 of the first embodiment, the adhesion between the second surface 52b excluding the uneven surface $52b_1$ and the contact surface 14-1a is improved by providing the bracket 14 which includes the contact surface 14-1a which is in contact with the second surface 52b of the second plate member 52 constituting the suspension frame 27, and the recess 14A provided in the portion facing the uneven surface $52b_1$, and is separated from the uneven surface $52b_1$, and fixing the dynamic vibration absorber 18 to the flat surface 14-1b of the bracket 14, which is located on the side opposite to the contact surface 14-1a, and therefore, it becomes possible to efficiently transmit the load which is applied to the wheel set 25 to the dynamic vibration absorber 18.

In this way, it becomes possible to sufficiently suppress the vibration which is transmitted from the suspension frame 27 to the vehicle body 12, and therefore, the ride comfort (vibration or noise) of the railway vehicle 10 can be improved.

Figure 8:
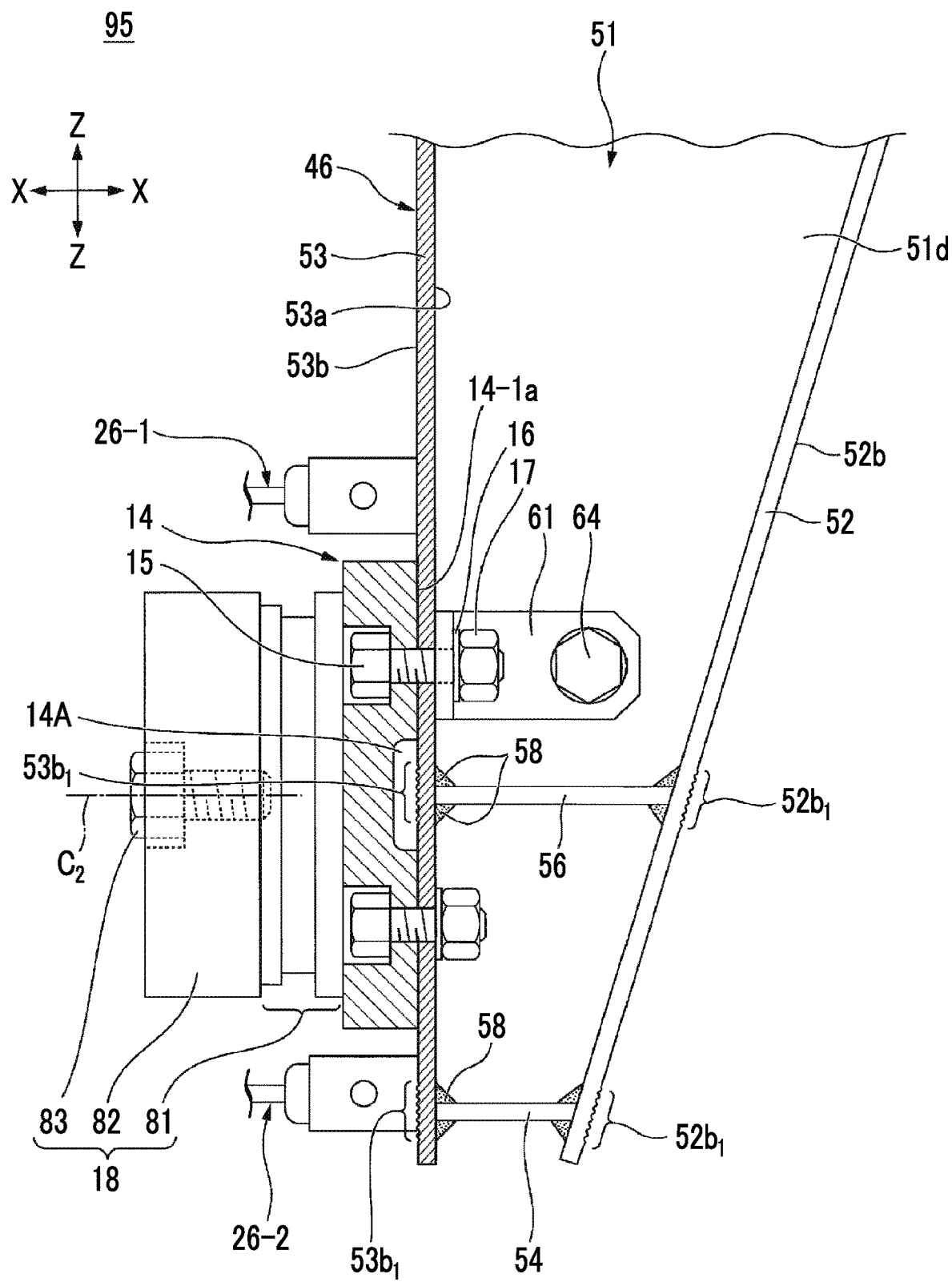
FIG. 8 is a side view showing a main section of a railway vehicle according to a first modification example of the first embodiment of the present invention.

FIG. 8 is a side view showing a main section of a railway vehicle according to a first modification example of the first modification example of the first embodiment of the present invention. In FIG. 8, for convenience of description, only the second plate member 53 and the bracket 14 are shown in cross-section. In FIG. 8, since it is difficult to illustrate the reinforcing plate 62 on the side opposite to the reinforcing plate 61, the illustration of the reinforcing plate 62 is omitted. In FIG. 8, the same constituent portions as those of the structure shown in FIG. 3 are denoted by the same reference numerals.

Referring to FIG. 8, a railway vehicle 95 according to the first modification example of the first embodiment is configured in the same manner as the railway vehicle 10 of the first embodiment except that the disposition positions of the reinforcing plates 61 and 62, the bracket 14, and the dynamic vibration absorber 18 configuring the railway vehicle 10 are different from those in the railway vehicle 10.

In the railway vehicle 95, the bracket 14 is fixed to the second plate member 53 in such a manner that the second surface 53b (excluding the uneven surface $53b_1$) which is a flat surface orthogonal to the X-X direction and parallel to the Z-Z direction comes into contact with the contact surface 14-1a such that the formation region of the uneven surface $53b_1$ faces the recess 14A.

For this reason, the extending direction of a central axis $C_2$ of the dynamic vibration absorber 18 fixed to the bracket 14 coincides with the X-X direction.

The bracket 14 is disposed to be separated from the uneven surface $53b_1$ due to the recess 14A.

In this manner, even in a case where the bracket 14 and the dynamic vibration absorber 18 are provided on the side of the traction links 26-1 and 26-2, the adhesion between the second surface 53b excluding the uneven surface $53b_1$ and the contact surface 14-1a is improved, and therefore, it becomes possible to efficiently transmit the load which is applied to the wheel set to the dynamic vibration absorber 18.

In this way, it becomes possible to sufficiently suppress the vibration which is transmitted from the hanging part 46 to the vehicle body, and therefore, the ride comfort (vibration or noise) of the railway vehicle 95 can be improved.

In FIG. 8, as an example, a case where the bracket 14 is provided on the second surface 53b of the second plate member 53 orthogonal to the X-X direction and parallel to the Z-Z direction has been described as an example. However, for example, a bracket 14 may be provided on the second surface 53b of the second plate member 53 inclined in the X-X direction and the Z-Z direction.

Figure 9:
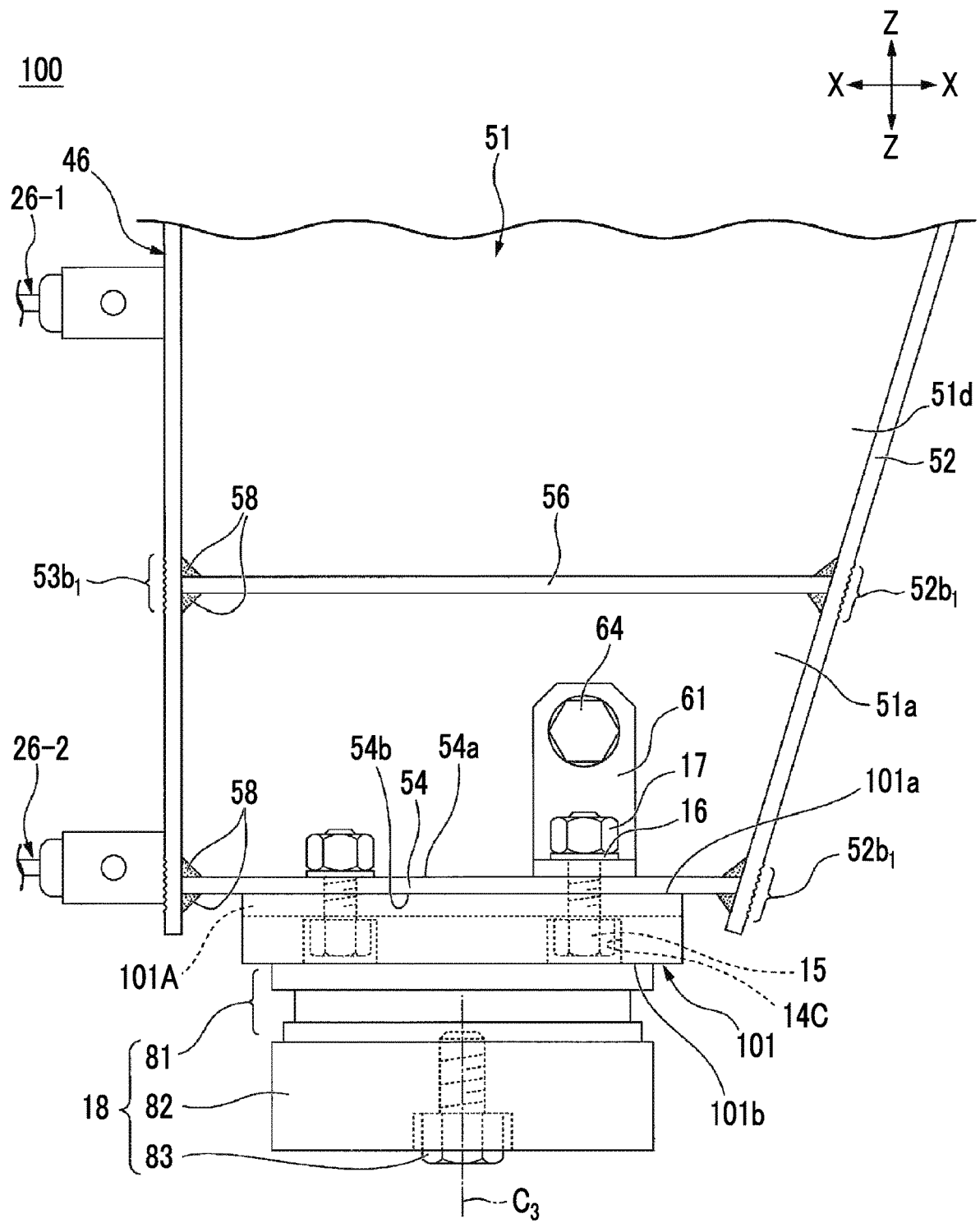
FIG. 9 is a side view showing a main section of a railway vehicle according to a second modification example of the first embodiment of the present invention.

FIG. 9 is a side view showing a main section of a railway vehicle according to a second modification example of the first modification example of the first embodiment of the present invention.

In FIG. 9, since it is difficult to illustrate the reinforcing plate 62 on the side opposite to the reinforcing plate 61, the illustration of the reinforcing plate 62 is omitted. In FIG. 9, the same constituent portions as those of the structure shown in FIG. 3 are denoted by the same reference numerals.

Referring to FIG. 9, a railway vehicle 100 according to the second modification example of the first embodiment is configured in the same manner as the railway vehicle 10 of the first embodiment except that the disposition positions of the reinforcing plates 61 and 62 and the dynamic vibration absorber 18 configuring the railway vehicle 10 of the first embodiment are different from those in the railway vehicle 10 and a bracket 101 is provided instead of the bracket 14.

Figure 10:
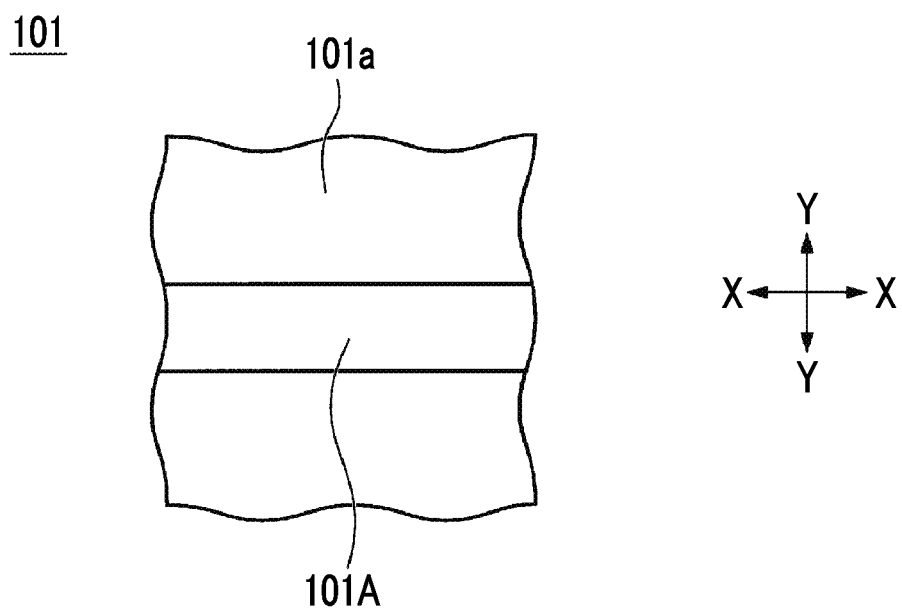
FIG. 10 is a plan view of a main section of the bracket, as viewed from the side which comes into contact with the second plate member.

FIG. 10 is a plan view of a main section of the bracket, as viewed from the side which comes into contact with the second plate member. In FIG. 10, the same constituent portions as those of the structure shown in FIG. 9 are denoted by the same reference numerals.

Referring to FIGS. 9 and 10, the bracket 101 is configured in the same manner as the bracket 14 except that the bracket 101 has a recess 101A instead of the recess 14A configuring the bracket 14 described in the first embodiment and the disposition positions of the reinforcing plates 61 and 62 and the dynamic vibration absorber 18 are different from those in the bracket 14.

The reinforcing plate 61 is provided over the first surface 54a of the second plate member 54 and the surface 51d of the first plate member 51. Further, a reinforcing plate (the reinforcing plate 62 shown in FIG. 4) (not shown) is provided on the side opposite to the reinforcing plate 61.

The bracket 101 has the recess 101A facing an uneven surface (not shown) formed on the second surface 54b by two line-like welded portions 58 provided in the Y-Y direction of the first plate member 51 shown in FIG. 6 and extending in the X-X direction.

The bracket 101 is fixed to the second plate member 54 such that the second surface 54b of the second plate member 54 configuring the hanging part 46 and a contact surface 101a of the bracket 101 come into contact with each other.

The dynamic vibration absorber 18 is fixed to a surface 101b (a surface which is located on the side opposite to the contact surface 101a) of the bracket 101. For this reason, a central axis $C_3$ of the dynamic vibration absorber 18 extends in the same direction as the Z-Z direction.

In this manner, even in a case where the bracket 101 including the recess 101A facing an uneven surface (not shown) formed on the second surface 54b of the second plate member 54 is fixed and the dynamic vibration absorber 18 is fixed to the bracket 101, the adhesion between the second surface 54b excluding the uneven surface (not shown) and the contact surface 101a is improved, and therefore, it becomes possible to efficiently transmit the load which is applied to the wheel set to the dynamic vibration absorber 18.

In this way, it becomes possible to sufficiently suppress the vibration which is transmitted from the hanging part 46 to the vehicle body, and therefore, the ride comfort (vibration or noise) of the railway vehicle 100 can be improved.

In FIG. 9, as an example, a case where the bracket 101 is provided on the second surface 54b of the second plate member 54 orthogonal to the Z-Z direction and parallel to the X-X direction has been described as an example. However, the bracket 101 may be provided on the second surface 54b of the second plate member 54 inclined in the X-X direction and the Z-Z direction.

Second Embodiment

Figure 11:
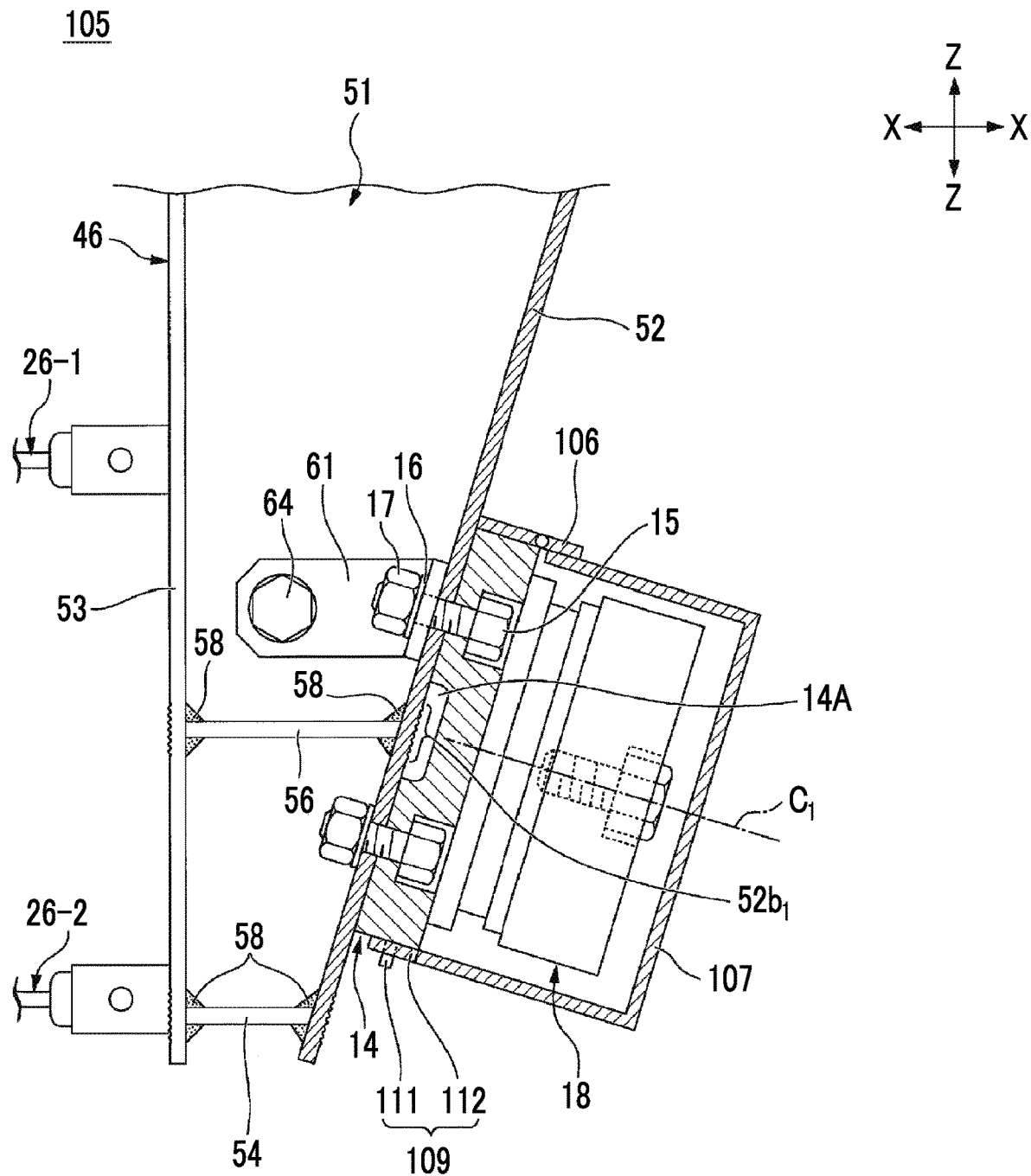
FIG. 11 is a side view showing a main section of a railway vehicle according to a second embodiment of the present invention and is a diagram schematically showing a state where a protective cover is closed.

FIG. 11 is a side view showing a main section of a railway vehicle according to a second embodiment of the present invention and is a diagram schematically showing a state where a protective cover is closed.

Figure 12:
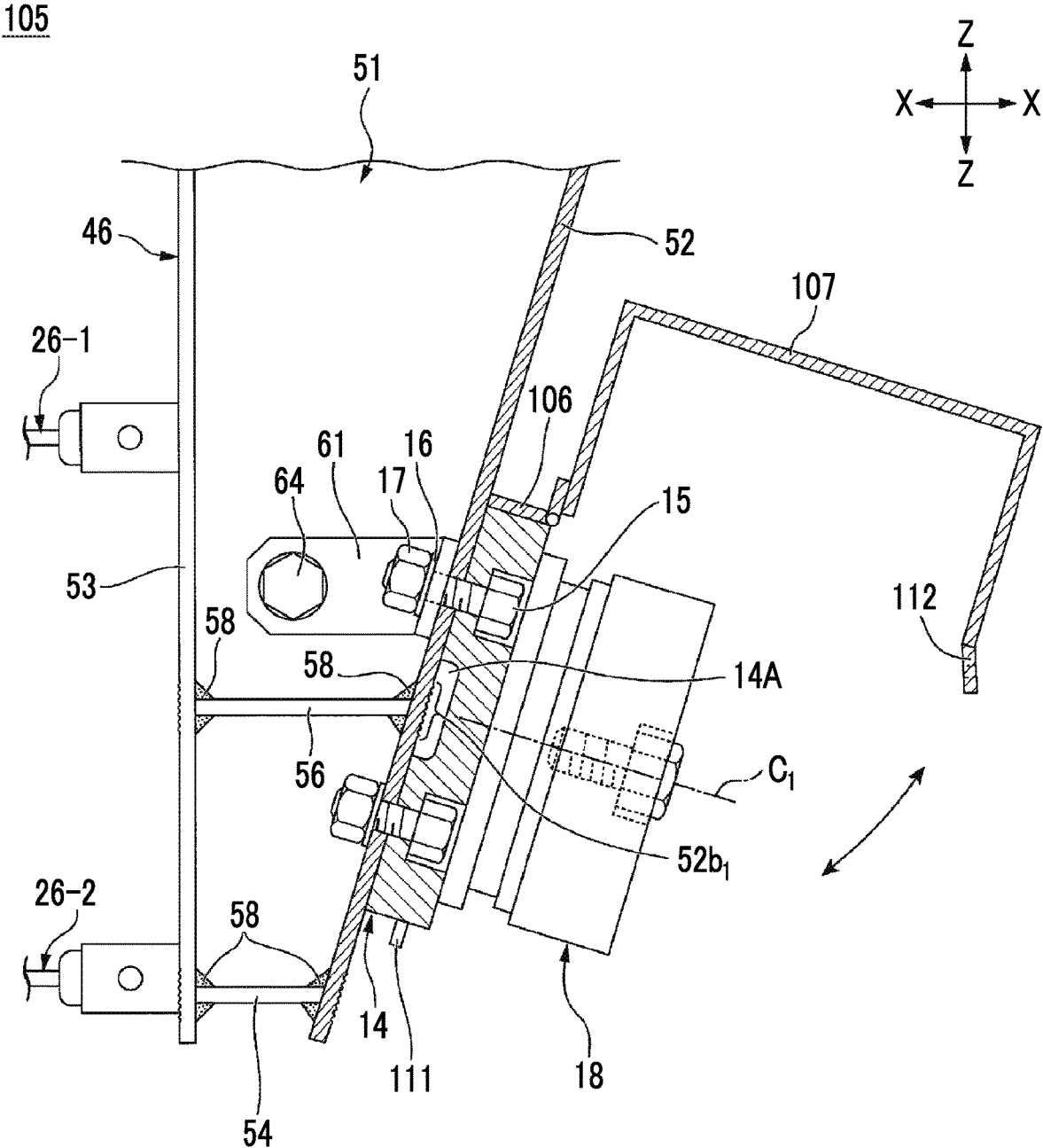
FIG. 12 is a side view showing the main section of the railway vehicle according to the second embodiment of the present invention and is a diagram schematically showing a state where the protective cover is opened.

FIG. 12 is a side view showing the main section of the railway vehicle according to the second embodiment of the present invention and is a diagram schematically showing a state where the protective cover is opened.

In FIGS. 11 and 12, the bracket 14, the second plate member 52, a protective cover 107, a position restricting mechanism 109, and a hooking portion 112 are shown in cross-section. In FIG. 11, the same constituent portions as those of the structure shown in FIG. 3 are denoted by the same reference numerals. In FIG. 12, the same constituent portions as those of the structure shown in FIGS. 3 and 11 are denoted by the same reference numerals. Further, the arrow shown in FIG. 12 indicates an opening and closing direction of the protective cover 107.

Referring to FIGS. 11 and 12, a railway vehicle 105 of the second embodiment is configured in the same manner as the railway vehicle 10 of the first embodiment except that a hinge part 106, the protective cover 107, and the position restricting mechanism 109 are further provided in the configuration of the railway vehicle 10 of the first embodiment.

The hinge part 106 has two hinge pieces. One of the hinge pieces is fixed to the side wall of the bracket 14 and the other hinge piece is fixed to the outside of the protective cover 107. In this way, the hinge part 106 supports the protective cover 107 so as to be openable and closable with respect to the dynamic vibration absorber 18.

The protective cover 107 has such a shape capable of surrounding the dynamic vibration absorber 18 and has such a size that it does not come into contact with the dynamic vibration absorber 18 when it has been opened with respect to the dynamic vibration absorber 18. The protective cover 107 can be made of, for example, transparent resin.

The protective cover 107 has a function of protecting the dynamic vibration absorber 18 from rainwater, dust, or the like in a state where it is closed with respect to the dynamic vibration absorber 18, and has a function of suppressing falling of the dynamic vibration absorber 18 onto a traveling surface.

The position restricting mechanism 109 has an engaging protrusion portion 111 and the hooking, portion 112. The engaging protrusion portion 111 is provided at a position where the side wall of the bracket 14 and a through-hole (not shown) provided in the hooking portion 112 face each other when the protective cover 107 has been closed.

The engaging protrusion portion 111 is engaged with the through-hole (not shown) provided in the hooking portion 112, thereby restricting the position of the protective cover 107. That is, the protective cover 107 maintains a closed posture.

The hooking portion 112 is provided in the protective cover 107 and has the through-hole (not shown) described above.

According to the railway vehicle 105 of the second embodiment, the railway vehicle 105 has the hinge part 106 provided at the side wall of the bracket 14, the protective cover 107 having a shape that surrounds the dynamic vibration absorber 18 and supported by the hinge part 106 so as to be openable and closable with respect to the dynamic vibration absorber 18, and the position restricting mechanism 109 which is provided in the side wall of the bracket 14 and the protective cover 107 and restricts the position of the protective cover 107 in a state where the protective cover 107 has been closed, whereby it is possible to protect the dynamic vibration absorber 18 from rainwater, dust, or the like in a state of being closed with respect to the dynamic vibration absorber 18, and to suppress falling of the dynamic vibration absorber 18 onto the traveling surface.

Further, since the protective cover 107 is fixed to the bracket 14 through the hinge part 106, the opening and closing operation of the protective cover 107 can be easily performed.

Further, the railway vehicle 105 of the second embodiment configured as described above can also obtain the same effect as that of the railway vehicle 10 of the first embodiment.

In the second embodiment, a case of being configured such that the protective cover 107 can be opened and closed by using the hinge part 106 has been described as an example. However, the protective cover may be fixed to the bracket 14 by screws without using the hinge part 106. In this case, it is favorable if the protective cover is configured in such a size that a part of the inner wall of the protective cover faces the side wall of the bracket 14.

By using such a protective cover fixed to the side wall of the bracket 14 by screws, it is possible to obtain the same effect as that of the railway vehicle 105 of the second embodiment.

Third Embodiment

Figure 13:
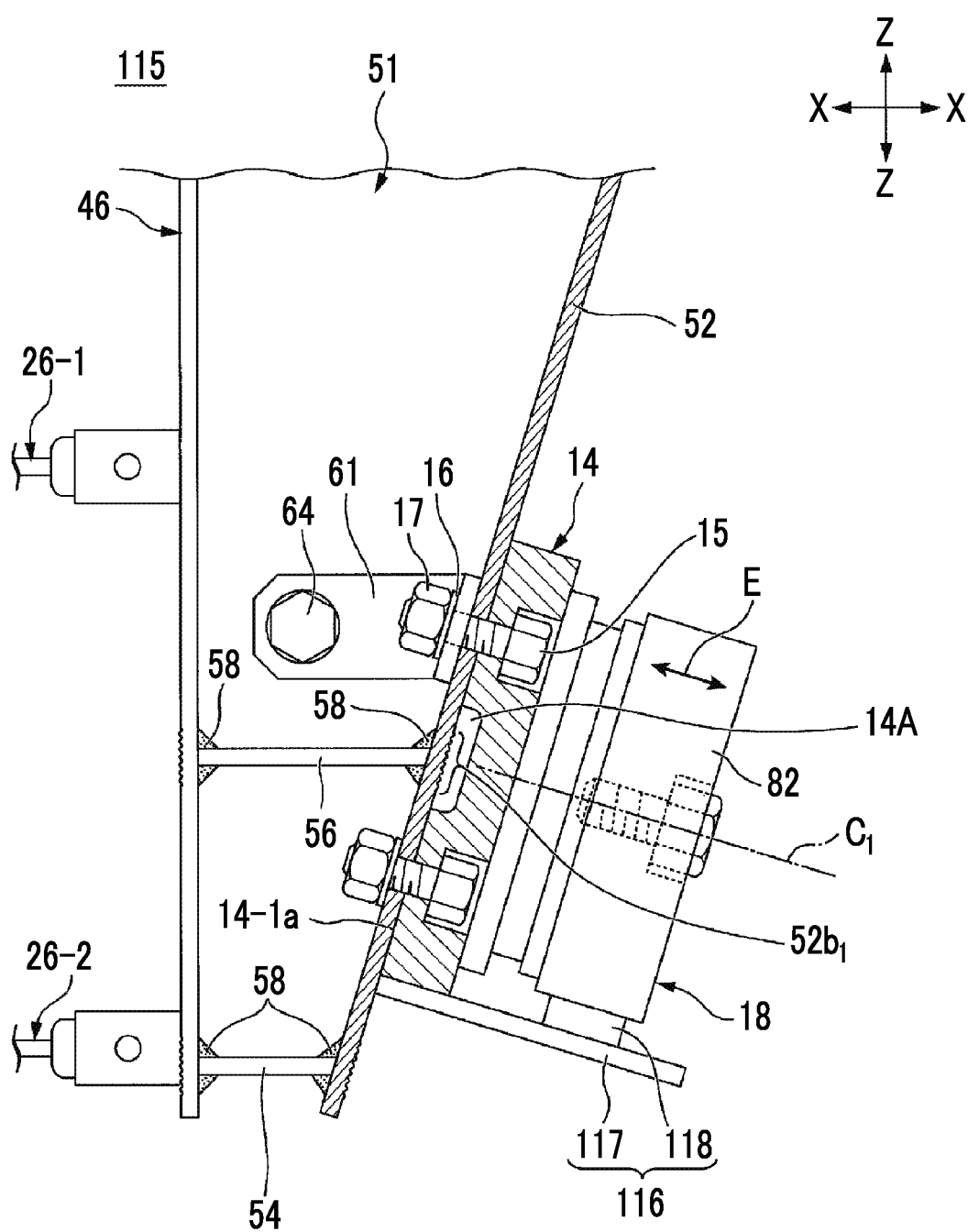
FIG. 13 is a side view showing a main section of a railway vehicle according to a third embodiment of the present invention.

FIG. 13 is a side view showing a main section of a railway vehicle according to a third embodiment of the present invention.

In FIG. 13, the bracket 14 and the second plate member 52 are shown in cross-section. In FIG. 13, the same constituent portions as those of the structure shown in FIG. 3 are denoted by the same reference numerals. E shown in FIG. 13 indicates a guiding direction (hereinafter referred to as an "E direction") of the weight section 82, which is parallel to the central axis $C_1$.

Referring to FIG. 13, a railway vehicle 115 of the third embodiment is configured in the same manner as the railway vehicle 10 of the first embodiment except that a guide mechanism 116 is further provided in the configuration of the railway vehicle 10 of the first embodiment.

The guide mechanism 116 includes a rail 117 and a slider 118. The rail 117 extends in the E direction and is fixed to the bracket 14. The rail 117 can be fixed to the bracket 14 by screws, for example. The rail 117 supports the slider 118 so as to be slidable in the E direction.

The slider 118 is disposed between the weight section 82 and the rail 117 and is fixed to the weight section 82. In this way, the slider 118 is configured to be able to slide (vibrate) the weight section 82 in the E direction (that is, in the same direction as the extending direction of the central axis $C_1$ of the dynamic vibration absorber 18).

According to the railway vehicle 115 of the third embodiment, the railway vehicle 115 has the guide mechanism 116 for guiding the weight section 82 in the extending direction of the central axis $C_1$ of the dynamic vibration absorber 18, whereby it becomes possible to vibrate the weight section 82 in the same direction (the E direction) as the extending direction of the central axis $C_1$ of the dynamic vibration absorber 18.

That is, it becomes possible to suppress the vibration of the weight section 82 in directions other than the extending direction of the central axis $C_1$ orthogonal to the contact surface 14-1a of the bracket 14, which is generated due to the self-weight of the weight section 82.

In this way, it becomes possible to efficiently transmit the load in the extending direction of the central axis $C_1$ of the dynamic vibration absorber 18 to the weight section 82, and therefore, the performance of the dynamic vibration absorber 18 can be effectively exerted.

The hinge part 106, the protective cover 107, and the position restricting mechanism 109 shown in FIG. 11 may be provided in the railway vehicle 115 of the third embodiment shown in FIG. 13. In this case, for example, a configuration may be made such that the protective cover 107 surrounds the guide mechanism 116.

In this way, it is possible to obtain the same effect as that of the railway vehicle 105 of the second embodiment and to protect the rail 117 and the slider 118 from rainwater or dust.

The protective cover 107 which covers only the dynamic vibration absorber 18 and is openable and closable with respect to the dynamic vibration absorber 18 may be provided.

Fourth Embodiment

Figure 14:
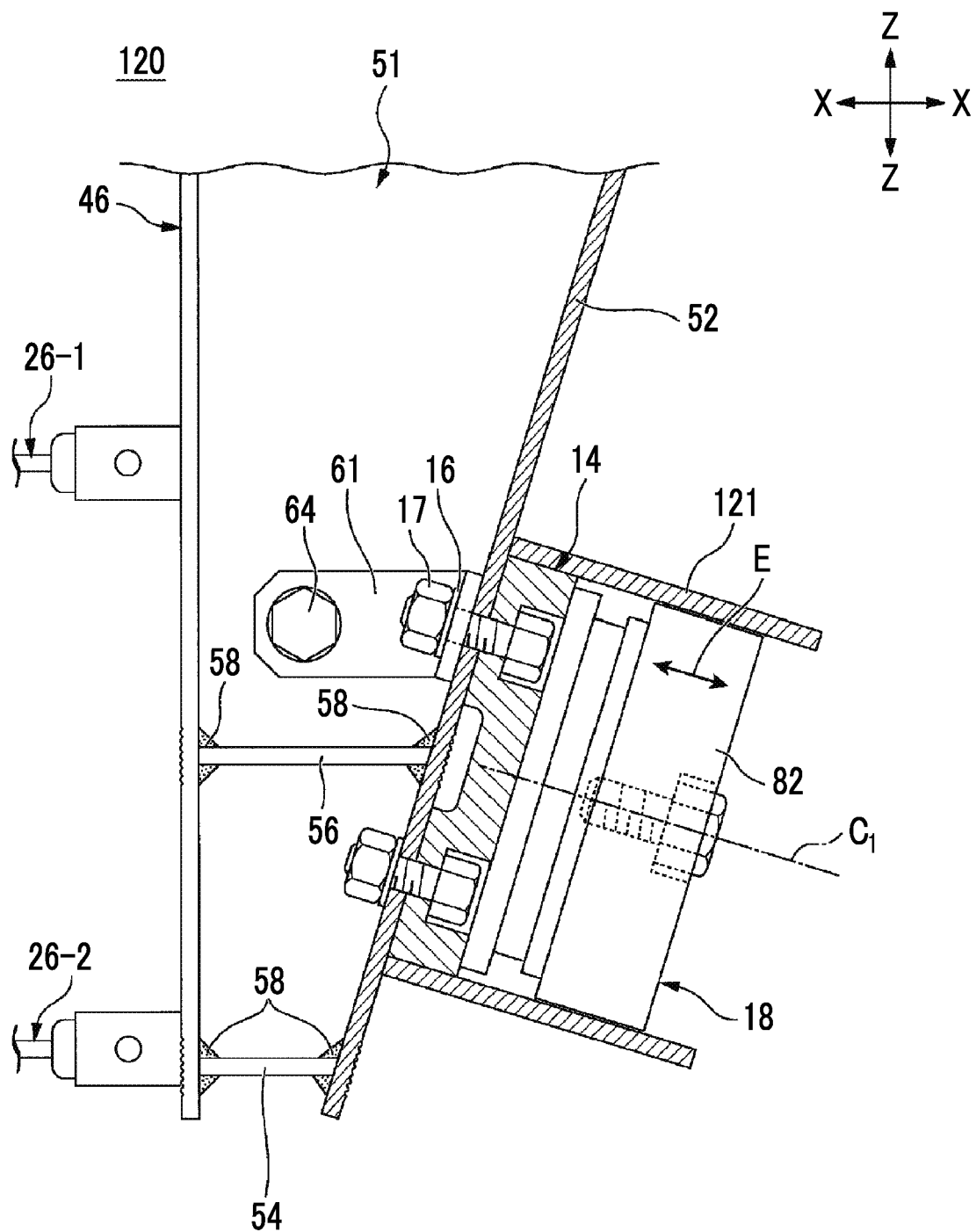
FIG. 14 is a side view showing a main section of a railway vehicle according to a fourth embodiment of the present invention.

FIG. 14 is a side view showing a main section of a railway vehicle according to a fourth embodiment of the present invention.

In FIG. 14, the bracket 14, the second plate member 52, and a guide mechanism 121 are shown in cross-section. In FIG. 14, the same constituent portions as those of the structure shown in FIGS. 3 and 13 are denoted by the same reference numerals.

Referring to FIG. 14, a railway vehicle 120 of the fourth embodiment is configured in the same manner as the railway vehicle 10 of the first embodiment except that a guide mechanism 121 is further provided in the configuration of the railway vehicle 10 of the first embodiment.

The guide mechanism 121 is a tubular guide mechanism. The guide mechanism 121 accommodates the bracket 14 and the dynamic vibration absorber 18 and is fixed to the side wall of the bracket 14. The guide mechanism 121 extends in the E direction. The central axis of the guide mechanism 121 coincides with the central axis $C_1$ of the dynamic vibration absorber 18.

The guide mechanism 121 surrounds the weight section 82. The inner wall of the guide mechanism 121 guides the weight section 82 in a state where the weight section 82 can vibrate in the E direction.

According to the railway vehicle 120 of the fourth embodiment, the railway vehicle 120 has the guide mechanism 121 having a tubular shape and guiding the weight section 82 in a state where the weight section 82 can vibrate in the extending direction of the central axis $C_1$ of the dynamic vibration absorber 18 due to the inner wall, whereby it is possible to obtain the same effect as that of the railway vehicle 115 of the third embodiment.

Further, the guide mechanism 121 and the outer circumference of the weight section 82 come into contact with each other, whereby it becomes possible to control the vibration direction of the weight section 82 to the E direction (the extending direction of the central axis $C_1$), and therefore, it is possible to enhance the control of the vibration direction of the weight section 82.

A lid body (not shown) which can be opened and closed with respect to the guide mechanism 121 may be provided at an end portion on the side where the weight section 82 is disposed, out of the end portions of the guide mechanism 121.

The lid body may be configured to be opened and closed, for example, by using the hinge part 106 and the position restricting mechanism 109 shown in FIG. 11. Alternatively, a lid body (not shown) attachable and detachable to and from the end portion of the guide mechanism 121 on the side where the weight section 82 is disposed may be provided.

By providing such a lid body, it is possible to suppress falling of the weight section 82 onto the traveling surface.

The preferred embodiments of the present invention have been described in detail above. However, the present invention is not limited to the specific embodiments, and various modifications and changes can be made within the scope of the gist of the present invention stated in the claims.

INDUSTRIAL APPLICABILITY

The present invention is applicable to a railway vehicle which travels on a track while being guided by a guide rail or the like.

REFERENCE SIGNS LIST 10, 95, 100, 105, 115, 120: railway vehicle
12: vehicle body
12a: lower surface
13: running device
14, 101: bracket
14A, 101A: recess
14-1: first portion
14-1a, 101a: contact surface
14-1b, 101b: surface
14-2: second portion
14A: recess
14B, 82B: screw portion insertion hole
14C, 82A: counterbore
14D: through-hole
15, 19: bolt
16, 20: washer
17, 21: nut
18: dynamic vibration absorber
22: driving source
23: drive shaft
24: gear box
25: wheel set
26-1 to 26-3: traction link
27: suspension frame
34: casing
35: vibration-proofing material
37-1, 37-2: wheel
39: axle shaft
41-1, 41-2: bogie frame
45: fixed part
46: hanging part
51: first plate member
51A: upper side
51a, 51b, 51c: end surface
51d, 51e: surface
51B: lower side
51C, 51D: side
52 to 54: second plate member
52a, 53a, 54a: first surface
52b, 53b, 54b: second surface
$52b_1$, $53b_1$: uneven surface
56, 57: third plate member
56a, 56b, 57a: surface
58: welded portion
61, 62: reinforcing plate
64, 83: bolt
65: washer
67: nut
71, 72: shaft mounting member
74, 75: shaft
81: damper section
82: weight section
82a, 82b, 86a, 86b, 87a: surface
85: first support plate
86: elastic section
87: second support plate
106: hinge part
107: protective cover
109: position restricting mechanism
111: engaging protrusion portion
112: hooking portion
116, 121: guide mechanism
117: rail
118: slider
$C_1$ to $C_3$: central axis
$D_1$, $D_2$: area
E: direction

The invention claimed is:

1. A railway vehicle comprising:
a vehicle body;
a suspension frame having a first plate member which is fixed to a lower portion of the vehicle body and extends downward from the vehicle body and in a traveling direction of the vehicle body, a second plate member having a first surface which is in contact with an end surface of the first plate member, and a second surface which is located on the side opposite to the first surface, a welded portion which is disposed on the first surface and connects the first plate member and the second plate member to each other, and an uneven surface which includes a plurality of concavities and convexities provided in a portion which is located on the side opposite to the welded portion, of the second surface;

a bogie device which includes a driving source and a wheel set which is rotationally driven by the driving source;

a traction link which is connected to the wheel set and the suspension frame and extends in the traveling direction of the vehicle body;

a bracket which includes a contact surface which is in contact with the second surface, and a recess provided in a portion facing the uneven surface; and a dynamic vibration absorber which includes a damper section which is located on the side opposite to the contact surface and fixed to the bracket, and a weight section which is located on the side opposite to the side where the bracket is provided, and is disposed on the damper section, wherein the bracket is separated from the uneven surface.

2. The railway vehicle according to claim 1, wherein the second surface of the second plate member connected to the end surface of the first plate member is inclined with respect to an up-down direction of the vehicle body and the traveling direction of the vehicle body.

3. The railway vehicle according to claim 1, further comprising a protective cover having a shape which surrounds the dynamic vibration absorber, and attachable and detachable to and from the bracket.

4. The railway vehicle according to claim 1, further comprising:

a hinge part provided on a side wall of the bracket;

a protective cover having a shape which surrounds the dynamic vibration absorber, and supported by the hinge part so as to be openable and closable with respect to the dynamic vibration absorber; and a position restricting mechanism provided on the side wall of the bracket and the protective cover to restrict a position of the protective cover in a state where the protective cover is closed.

5. The railway vehicle according to claim 1, further comprising a guide mechanism for guiding the weight section in an extending direction of a central axis of the dynamic vibration absorber.

6. The railway vehicle according to claim 5, further comprising:

a hinge part provided at the guide mechanism;

a protective cover having a shape which surrounds a portion exposed from the guide mechanism, of the dynamic vibration absorber, and supported by the hinge part so as to be openable and closable with respect to the guide mechanism; and a position restricting mechanism which restricts a position of the protective cover in a state where the protective cover is closed.

7. The railway vehicle according to claim 1, wherein a reinforcing plate for reinforcing the suspension frame is provided at the suspension frame corresponding to a disposition position of the bracket.

* * * * *